United States Patent
Brkic et al.

(10) Patent No.: US 11,972,503 B2
(45) Date of Patent: Apr. 30, 2024

(54) GRAPHICS PROCESSING

(71) Applicant: Arm Limited, Cambridge (GB)

(72) Inventors: Toni Viki Brkic, Lund (SE); Sandeep Kakarlapudi, Trondheim (NO); Tord Kvestad Øygard, Trondheim (NO); Saurav Arjun, Lund (SE)

(73) Assignee: Arm Limited, Cambridge (GB)

( * ) Notice: Subject to any disclaimer, the term of this patent is extended or adjusted under 35 U.S.C. 154(b) by 84 days.

(21) Appl. No.: 17/662,350

(22) Filed: May 6, 2022

(65) Prior Publication Data
US 2022/0358616 A1  Nov. 10, 2022

(30) Foreign Application Priority Data
May 6, 2021 (GB) ..................................... 2106481

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 9,153,070 B2* | 10/2015 | Nystad | ...................... | G06T 1/20 |
| 9,214,006 B2* | 12/2015 | Heggelund | ........... | G06T 15/005 |
| 9,454,844 B2* | 9/2016 | Döffinger | .............. | G06T 15/405 |
| 10,832,464 B2* | 11/2020 | Nystad | .................. | G06T 15/005 |
| 2018/0349315 A1 | 12/2018 | Heggelund | | |
| 2021/0065437 A1 | 3/2021 | Brkic | | |

OTHER PUBLICATIONS

Combined Search and Examination Report dated Mar. 4, 2022, GB Patent Application No. GB2106481.1.

* cited by examiner

*Primary Examiner* — Edward Martello
(74) *Attorney, Agent, or Firm* — Vierra Magen Marcus LLP

(57) ABSTRACT

A method of operating a graphics processor that executes a graphics processing pipeline that includes an early culling tester that can access plural different culling test data buffers is disclosed. Information is maintained indicating which of the plural culling test data buffers is expected to be accessed, and the information is used to control the early culling tester. The information may be used to control the early culling tester such that processing delays associated with waiting for dependencies to resolve are reduced.

19 Claims, 15 Drawing Sheets

GRAPHICS PROCESSING

CROSS-REFERENCE TO RELATED APPLICATIONS

This application claims priority pursuant to 35 U.S.C. 119(a) to United Kingdom Patent Application No. 2106481.1, filed May 6, 2021, which application is incorporated herein by reference in its entirety.

FIELD OF THE INVENTION

The technology described herein relates to computer graphics processing, and in particular to hidden surface removal in graphics processing.

BACKGROUND

Graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles or quadrilaterals, or points or lines.

Once the primitives have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve performing fragment shading, applying textures, blending sample point data values, etc.

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

Correspondingly, each graphics fragment may typically be the same size and location as a "pixel" of the output (e.g. output frame), but it can be the case that there is not a one to one correspondence between a fragment and a display pixel, for example where particular forms of post-processing, such as downsampling, are carried out on the rendered image prior to displaying the final image.

One drawback of current graphics processing systems is that because primitives are processed sequentially, and typically not in perfect front to back order, a given sampling point (and hence fragment and pixel) may be shaded multiple times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

A number of techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, forms of hidden surface removal may be carried out before a primitive and/or fragment is sent for rendering, to see if the primitive or fragment etc. will be obscured by a primitive that has already been rendered (in which case the new primitive and/or fragment need not be rendered). Such so-called "early" hidden surface removal may comprise, for example, early occlusion culling, such as early depth (Z) and/or stencil (S) testing processes.

These arrangements try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

However, these "early" (prior to rendering) hidden surface removal (culling) techniques can still suffer from inefficiencies.

For example, a later graphics fragment for a given sampling position in the render output being generated may only be able to be tested (e.g. depth tested) when an earlier graphics fragment (that is already being processed) for that position in the render output has completed its processing (so as to allow all the required information for testing the later graphics fragment to be available in the, e.g., depth buffer). When such a "dependency" occurs, the later graphics fragment is typically stalled at the early hidden surface removal (culling) test stage until the earlier graphics fragment or fragments (that preceded it into the graphics processing pipeline) have completed their processing, i.e. until the "dependency" is "resolved". However, this may cause a delay in processing and throughput of the graphics fragments.

The Applicants believe there remains scope for improvements to graphics processors and systems.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

SUMMARY

Figures 1, 2:
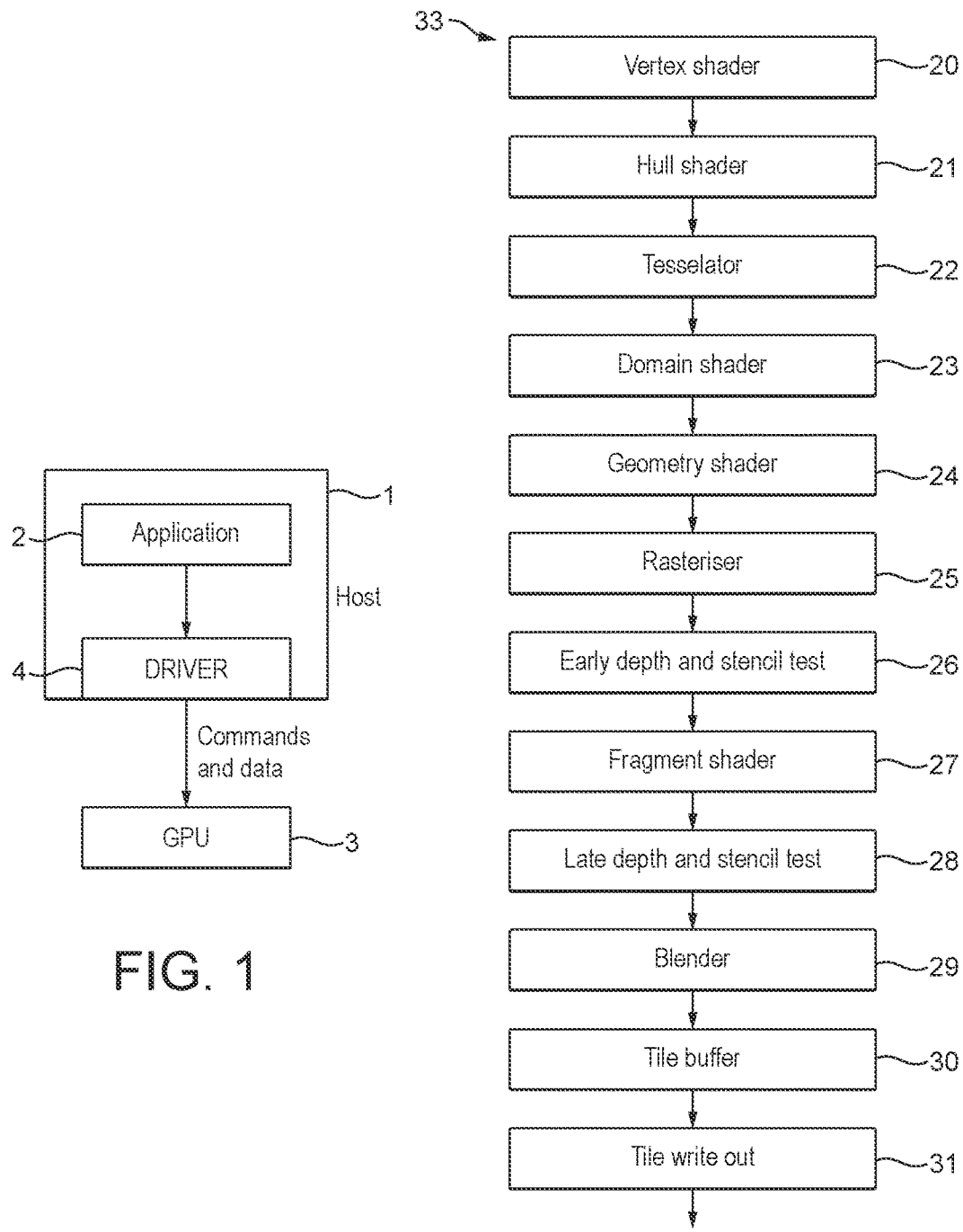
FIG. 1 shows an exemplary graphics processing system including a graphics processor.
FIG. 2 shows schematically a graphics processing pipeline that can be executed by the graphics processor of FIG. 1.

A first embodiment of the technology described herein comprises a method of operating a graphics processor that is operable to execute a graphics processing pipeline that comprises plural processing stages including an early culling tester followed by a renderer;
wherein the graphics processor comprises plural culling test data buffers, wherein each of the plural culling test data buffers is operable to store a respective set of data values for use by the early culling tester;
the method comprising:
maintaining information that indicates which, if any, of the plural culling test data buffers are expected to be accessed by a processing stage of the graphics processing pipeline after the early culling tester; and
using the information to control the early culling tester.

A second embodiment of the technology described herein comprises a graphics processor that is operable to execute a graphics processing pipeline that comprises plural processing stages including an early culling tester followed a renderer; the graphics processor comprising:
plural culling test data buffers, wherein each of the plural culling test data buffers is operable to store a respective set of data values for use by the early culling tester; and
a processing circuit configured to maintain information that indicates which, if any, of the plural culling test data buffers are expected to be accessed by a processing stage of the graphics processing pipeline after the early culling tester;
wherein the graphics processor is configured to control the early culling tester using information maintained by the processing circuit.

The technology described herein is concerned with a graphics processing pipeline that includes an early culling tester that should be, and in an embodiment is, operable to perform early (i.e. prior to rendering) culling tests using data values stored in plural different culling test data buffers. For example and in an embodiment, the early culling tester is operable to perform early depth (Z) and/or stencil (S) tests, and for this purpose has access to depth (Z) data values stored in a depth (Z) buffer and stencil (S) data values stored in a stencil (S) buffer.

In the technology described herein, information is maintained that indicates which (if any) of the plural culling test data buffers are (have been determined as being) expected to be accessed (e.g. read from and/or written to) by a processing stage (or stages) of the graphics processing pipeline after the early culling tester (such as, and in an embodiment, the renderer and/or a late culling tester). In other words, the information should, and in an embodiment does, indicate, (separately) in respect of each of the plural culling test data buffers, whether or not the respective culling test data buffer is expected to be accessed by a processing stage (or stages) of the graphics processing pipeline after the early culling tester.

For example, and in an embodiment, the maintained information indicates whether or not a processing stage(s) after the early culling tester is expected to access (read from and/or write to) the depth (Z) buffer, and (separately) also whether or not a processing stage(s) after the early culling tester is expected to access (read from and/or write to) the stencil (S) buffer.

The maintained information is then used to control the early culling tester. In particular, and as will be discussed in more detail below, the maintained information is in an embodiment used to determine whether an early culling test to be performed by the early culling tester should wait for processing by a processing stage(s) after the early culling tester to be completed before being performed, or whether the early culling test can be performed without waiting for processing by a processing stage(s) after the early culling tester to be completed, i.e. the information is in an embodiment used when determining whether a dependency (currently) exists.

As will be discussed in more detail below, maintaining and using such information that indicates which (if any) of the plural culling test data buffers are expected be accessed for the purposes of at least some processing after the early culling tester, allows the early culling tester to be controlled in a more sophisticated manner, e.g. as compared to controlling the early culling tester based on "coarser grained" information that e.g. only indicates whether or not any of the plural culling test data buffers are expected to be accessed, but which does not indicate which of those plural culling test data buffers are expected to be accessed.

In particular, maintaining and using the "finer grained" information of the technology described herein can allow different dependency situations to be distinguished from each other, such that early culling testing can be performed with fewer delays than would otherwise be the case. For example and in an embodiment, the technology described herein can allow the early culling tester to perform an early depth (Z) test on a fragment without needing to wait for another fragment after the early culling tester which accesses the stencil (S) buffer but which does not access the depth (Z) buffer to complete its processing. Similarly, the technology described herein can allow, for example and in an embodiment, the early culling tester to perform an early stencil (S) test on a fragment without needing to wait for another fragment after the early culling tester which accesses the depth (Z) buffer but which does not access the stencil (S) buffer to complete its processing.

The technology described herein can thus reduce processing delays associated with waiting for dependencies to be resolved, and thus increase the throughput of the graphics fragments.

It will be appreciated, therefore, that the technology described herein can provide an improved graphics processor.

The graphics processing pipeline of the technology described herein can be any suitable graphics processing pipeline.

The graphics processing pipeline should be, and in an embodiment is, operable to generate a render output. The render output may comprise any suitable render output, such as frame for display, or render to texture output, etc. In an embodiment, the render output is an output frame in a sequence of plural output frames that the graphics processing pipeline generates.

The render output will typically comprise an array of data elements (sampling points) (e.g. pixels), for each of which appropriate render output data (e.g. a set of colour value data) is generated (by the renderer). The data may comprise, for example, a set of red, green and blue, RGB values and a transparency (alpha, a) value.

In an embodiment, the graphics processor (and pipeline) is a tile-based graphics processor (and pipeline). Thus, in an embodiment, the graphics processor (and pipeline) generates the render output on a tile-by-tile basis. To do this, the render output (area) is in an embodiment divided into plural rendering tiles for rendering purposes.

The tiles that the render output is divided into for rendering purposes can be any suitable and desired such tiles. The size and shape of the rendering tiles may normally be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment rectangular, and in an embodiment square. The size and number of tiles can be selected as desired. In an embodiment, each tile is 16×16, or 32×32 data elements (e.g. fragments or pixels) in size (with the render output then being divided into however many such tiles as are required for the render output size and shape that is being used).

To facilitate tile-based graphics processing, the graphics processor in an embodiment includes one or more tile buffers that store rendered data for a rendering tile being rendered by the tile-based graphics processor, until the tile-based graphics processor completes the rendering of the rendering tile.

The tile buffer may store an array or arrays of sample values for the tile in question, with the sample values in an embodiment being grouped into sets of one or more sample values (such as groups of 2×2 sample values) that are each associated with a respective (e.g. display) pixel. The sample values may, e.g., comprise colour values (a colour buffer), depth values (a depth buffer), stencil values (a stencil buffer), etc.

The tile buffer is in an embodiment provided local to (i.e. on the same chip as) the tile-based graphics processor, for example, and in an embodiment, as part of RAM that is located on (local to) the graphics processor (chip). The tile buffer may accordingly have a fixed storage capacity, for example corresponding to the data (e.g. for an array or arrays of sample values) that the tile-based graphics processor needs to store for (only) a single rendering tile until the rendering of that tile is completed.

Once a rendering tile is completed by the tile-based graphics processor, rendered data for the rendering tile should be, and in an embodiment is, written out from the tile buffer to other storage that is in an embodiment external to (i.e. on a different chip to) the tile-based graphics processor, such as a frame buffer in external memory, for use.

Rendering tiles may be combined to form the render output in any suitable and desired manner. In an embodiment, when each rendering tile of a render output is completed by the graphics processor, output data for the rendering tile is written out from the tile buffer to external memory, such as a frame buffer, such that rendering tiles for the render output are combined in the external memory. The graphics processor in an embodiment includes a write out circuit coupled to the tile buffer for this purpose.

The external memory could be, and is in an embodiment, on a different chip to the graphics processor, and may, for example, be a main memory of the overall graphics processing system that the graphics processor is part of. It may be dedicated memory for this purpose or it may be part of a memory that is used for other data as well.

The graphics processing pipeline of the technology described herein includes at least an early culling tester stage (circuit) followed by one or more processing stages after the early culling test that include at least a renderer stage (circuit). It will be appreciated here that a processing stage that is after another processing stage in the graphics processing pipeline may perform its respective processing on a fragment after the another processing stage, and thus may use a processing result generated by the another processing stage.

The graphics processing pipeline can, and in an embodiment does, comprise any other suitable and desired graphics processing pipeline stages.

In an embodiment, the graphics processing pipeline comprises, prior to the early culling tester and the renderer, a rasteriser (circuit) that is operable to rasterise primitives to generate graphics fragments for processing.

The rasteriser of the graphics processing pipeline can be configured to operate in any suitable and desired manner, for example as in known rasterising arrangements. It should, and in an embodiment does, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, a (and each) primitive being rasterised.

Each fragment generated by the rasteriser may represent (have associated with it) a single sampling point, or plural sampling points, as desired. In an embodiment, each fragment represents a set of plural, in an embodiment four (2×2), sampling points.

In an embodiment, the rasteriser is a hierarchical rasteriser that operates to iteratively test primitives against progressively smaller patches of sampling points down to a given, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested in an embodiment corresponds to an integer number of fragments, such as 16×16, 8×8, 4×4 and/or 2×2 fragments.

The renderer of the graphics processing pipeline should be, and is in an embodiment, operable to render (shade) graphics fragments it receives to generate output graphics fragment data. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc.

In an embodiment the renderer comprises a fragment shader (a shader pipeline) (i.e. a programmable pipeline stage that is operable to and can be programmed to carry out fragment shading programs on fragments in order to render them).

Output rendered fragment generated by the renderer is in an embodiment written to an output buffer, such as a frame buffer, in (the) external memory, for use (e.g. to display a frame on a display). This may be via one or more intermediate buffers, such as (the) one or more tile buffers in the case of a tile-based graphics processing pipeline, and/or via one or more processing, e.g., down-sampling, stages, if desired.

The early culling tester (circuit) may be operable to perform any suitable and desired early culling test. In an embodiment, the early culling tester is operable to perform an early occlusion test, such as a depth (Z) test. In an embodiment, the early culling tester is operable to perform a stencil (S) test. In an embodiment, the early culling tester is operable to perform both early depth and early stencil tests.

The early culling tester is in an embodiment operable to perform early culling tests on single fragments. The early culling tester is in an embodiment operable to perform early culling tests per sample, and so in an embodiment tests (covered) sampling points of a set of sampling points that a given fragment is associated with individually. Thus, the early culling tester is in an embodiment operable to perform early culling tests on single (covered) sampling points.

The early culling tester could also or instead be operable to perform early culling tests on plural sampling points, such as patches (sets) of plural fragments. Thus, in an embodiment, the early culling tester is operable to perform patch based early culling tests, i.e. early culling tests on patches (sets) of plural fragments. However, in an embodiment, the early culling tester that is controlled in the manner of the technology described herein is operable to perform early culling tests on individual fragments, and the graphics processing pipeline further comprises a patch based early culling test stage (tester) that operates on patches (sets) of plural fragments.

Patch based early culling tests may, for example and in an embodiment, be used where the rasteriser is a hierarchical rasteriser that can rasterise primitives into patches of plural fragments (as discussed above), with these patches then being subject as a whole to an early culling (e.g. depth) test. This test is in an embodiment carried out only for patches (sets) of plural fragments that are fully (completely) covered by the primitive in question, and in an embodiment uses a range of, e.g. depth, values for the patch (set) of plural fragments.

Thus, in an embodiment, the pipeline includes a patch based early culling tester (circuit) that tests sets (patches) of plural fragments, followed by the early culling tester (circuit) that tests individual fragments (whether as a whole, or in terms of their respective (individual) sampling points) (and that is controlled in the manner of the technology described herein). Other arrangements would be possible.

An (the) early culling tester may be implemented, e.g., as part of the rasteriser, or after the rasteriser (but before the renderer), or as a combination of this (e.g. where there is more than one early culling tester). In embodiment an (the) early culling test is implemented as part of the rasterisation process and/or after the rasteriser but before the rest of the graphics processing pipeline.

In an embodiment, the graphics processing pipeline further comprises a late culling tester (circuit) operable to perform late culling tests on graphics fragments that have been processed (rendered) by the renderer. The late culling tester in an embodiment performs late culling tests on fragments before the output rendered fragment data associated with the fragments is output (to an output buffer). Thus, in an embodiment, the graphics processing pipeline comprises both an early culling tester prior to the renderer, and a late culling tester after the renderer.

Where the graphics processing pipeline comprises both an early culling tester and a late culling tester, the graphics processing pipeline can in an embodiment be selectively configured to control whether or not a fragment is subjected to an early culling test by the early culling tester, and separately, whether or not a fragment is subjected to a late culling test by the late culling tester. The arrangement in this regard is in an embodiment as described in US 2018/349315, the entire contents of which is hereby incorporated herein by reference.

The late culling tester (circuit) may be operable to perform any suitable and desired late culling test. In an embodiment, the late culling tester is operable to perform a late occlusion test, such as a depth (Z) test. In an embodiment, the late culling tester is operable to perform a stencil (S) test. In an embodiment, the late culling tester is operable to perform both late depth and early stencil tests.

The late culling tester is in an embodiment operable to perform late culling tests on single fragments. The late culling tester is in an embodiment operable to perform late culling tests per sample, and so in an embodiment tests (covered) sampling points of a set of sampling points that a given fragment is associated with individually. Thus, the late culling tester is in an embodiment operable to perform late culling tests on single (covered) sampling points.

Thus, in an embodiment, the graphics processing pipeline comprises:
  a rasteriser that rasterises input primitives to generate graphics fragments to be processed, each graphics fragment having one or more sampling points associated with it;
  the early culling tester operable to perform early culling tests on fragments generated by the rasteriser before the fragments are sent to the renderer for rendering;
  the renderer that is operable to render fragments generated by the rasteriser to generate output fragment data; and (then)
  a late culling tester operable to perform late culling tests on fragments that have been rendered by the renderer before output fragment data for sampling points associated with the fragments is output (e.g. to external memory).

The graphics processor (further) comprises plural different culling test data buffers.

A (each) culling test data buffer should be, and is in an embodiment, a buffer that stores data values for use by at least the early culling tester. Thus, in an embodiment, at least the early culling tester has access to a, and in an embodiment each, culling test data buffer of the plural culling test data buffers.

In the technology described herein, at least one other processing stage after the early culling tester should also, and in an embodiment does, have access to a, and in an embodiment each, culling test data buffer of the plural culling test data buffers. In an embodiment, the late culling tester also has access to a, and in an embodiment each, culling test data buffer of the plural culling test data buffers.

Thus, in an embodiment, a (and in an embodiment each) culling test data buffer is a buffer that stores data values for use by at least the early culling tester and the late culling tester. In an embodiment, the renderer (also or instead) has access to a, and in an embodiment each, culling test data buffer of the plural culling test data buffers, e.g. for fragment shading purposes.

Thus, a processing stage(s) of the graphics processing pipeline after the early culling tester that the information of the technology described herein is indicative of expected buffer access by in an embodiment comprises the renderer and/or late culling tester.

Other processing stages of the graphics processing pipeline may (also) have access to the plural culling test data buffers. For example, and in an embodiment, where the pipeline further comprises a patch based early culling tester, a (each) culling test data buffer may (also) store data values for use by the patch based early culling tester (and thus the patch based early culling tester may (also) have access to the plural culling test data buffers, as appropriate).

A (each) culling test data buffer should store appropriate data values for use by the appropriate processing stage (or stages) that has access to it. Thus, in an embodiment, the data values that are stored in a culling test data buffer depend upon the nature of the culling tests that the early (and in an embodiment late) culling tester is operable to perform.

As mentioned above, the culling tests that the early (and in an embodiment late) culling tester is operable to perform in an embodiment include depth and/or stencil tests. Thus, the plural culling test data buffers in an embodiment comprise a depth buffer that stores depth values that are in an embodiment used when performing early (and in an embodiment late) depth tests. The plural culling test data buffers in an embodiment (also) comprise a stencil buffer that stores stencil values that are in an embodiment used when performing early (and in an embodiment late) stencil tests.

Thus, in an embodiment, the early culling tester is operable to perform early depth tests using depth values stored a depth buffer, and is operable to perform early stencil tests using stencil values stored in a stencil buffer. Correspondingly, in an embodiment, the late culling tester is operable to perform late depth tests using depth values stored the depth buffer, and is operable to perform late stencil tests using stencil values stored in the stencil buffer.

A (each) culling test data buffer may store data values for use by the early (and in an embodiment late) culling tester at any desired resolution. For example, and in an embodiment, data (e.g. depth) values may be stored for individual sampling positions in the render output being generated, for sets of plural sampling positions (e.g. corresponding to individual fragments) in the render output being generated, and/or for larger patches of the render output (e.g. comprising plural fragments).

The data values that are stored in a (each) culling test data buffer may comprise, e.g., individual (absolute) values, and/or suitable ranges of values (e.g. depth value ranges) may be stored for respective render output regions (locations), as desired.

Where the graphics processor is a tile-based graphics processor, the plural culling test data buffers are in an embodiment part of the tile buffer. Thus, a (each) culling test data buffer in an embodiment stores data values corresponding to (only) a single rendering tile.

A (early and/or late) culling test can be carried out in any suitable and desired manner, e.g., in the normal manner used in the graphics processing system in question.

A (early or late) culling test in an embodiment comprises a depth and/or stencil test, and in this case, the graphics processing pipeline can in an embodiment be selectively configured to control whether or not a (early or late) culling test comprises a depth test, and separately, whether or not a (early or late) culling test comprises a stencil test.

A (early or late) culling test should, and in an embodiment does, comprise (the early or late culling tester) reading data from (accessing) an appropriate culling test data buffer (or buffers), and using the read data to perform the (early or late) culling test.

Thus, for example and in an embodiment, a depth (but not stencil) test may comprise reading depth data from the depth buffer (but not stencil data from the stencil buffer). Similarly, a stencil (but not depth) test may comprise reading stencil data from the stencil buffer (but not depth data from the depth buffer). A depth and stencil test may comprise reading depth data from the depth buffer and reading stencil data from the stencil buffer.

The result of a (early or late) culling test performed in respect of a fragment is in an embodiment used as appropriate to determine whether the fragment is to be culled, and/or whether the fragment is to be used to update (write to) the associated culling test data buffer.

In an embodiment, the graphics processing pipeline can be selectively configured to control whether or not the result of a culling test on a fragment is used to determine whether to cull the fragment, and separately, whether or not the result of a culling test is used to determine whether to update (write to) the appropriate culling test data buffer. The arrangement in this regard is in an embodiment as described in US 2018/349315.

In the case where a fragment is being tested to determine whether to cull the fragment or not, then if the fragment being tested fails the culling test (e.g. is found to be occluded), then that fragment (or at least its appropriate sampling point or points) should be and are in an embodiment "culled" from further processing in the pipeline (i.e. have their further processing in the pipeline suppressed). In the case of the early culling test, such culling of a fragment from further processing in the pipeline in an embodiment comprises not subjecting the fragment to the rendering operations (shader pipeline), in an embodiment by not sending the fragment onwards through the pipeline for processing.

In this case, if (when) a culling test finds that fewer than all of the (covered) sampling points associated with a fragment to be rendered should be culled, then in an embodiment further processing of the sampling points in question (i.e., that failed the culling test) that can be avoided on an individual sampling point basis, such as blending, is prevented (stopped), e.g., by marking the sampling points as "disabled" (e.g. by indicating them to not be covered in a coverage mask associated with the fragment in question), or in any other suitable manner, but the fragment in question is still sent onwards (through the pipeline) so that the "non-culled" sampling points associated with the fragment will still be processed.

On the other hand, if (when) at least one sampling point for a fragment being tested passes the early culling test, then the sampling point (i.e. the fragment that the sampling point is associated with) that was tested is sent onwards for processing (e.g. towards the renderer).

If the culling test is a late culling test, then the fragment is in an embodiment "culled" from further processing by not using the rendered fragment data for the fragment (or at least for its appropriate sampling points) as rendered output data for the render output being generated. Thus the rendered fragment data for (any culled sampling points for) the fragment will, e.g., and in an embodiment, not be written to the tile and/or frame buffer, for example.

Thus, in an embodiment, the method of the technology described herein comprises (and the graphics processing pipeline is operable to (includes a processing circuit operable to)) using the result of a culling test to determine whether to cull a fragment or not; and when it is determined to cull the fragment, culling the fragment; and when it is determined to not cull the fragment, not culling the fragment.

On the other hand, if (when) a culling test is being used to determine whether to update (write to) the culling test data buffer with respect to the fragment being tested, if (when) a sampling point or points of the fragment being tested passes the culling test, then the appropriate culling test data buffer should be appropriately updated (written to) with new data for the sampling point(s) in question (that passed the culling test). Correspondingly, if (when) a sampling point or points of the fragment being tested fails the culling test, then the culling test data buffer should not be, and is in an embodiment not, updated (written to) with data for the sampling points of the fragment in question (that failed the test).

Thus, in an embodiment, the method of the technology described herein comprises (and the graphics processing pipeline is operable to (and includes a processing circuit operable to)) using a result of a culling test operation to determine whether to update (to write to) the appropriate culling test data buffer with data for a fragment or not; and when it is determined to update (write to) the culling test data buffer, updating (writing to) the culling test data buffer with data for the fragment; and when it is determined to not update (write to) the culling test data buffer, not updating (not writing to) the culling test data buffer with data for the fragment.

In the technology described herein, information is maintained that indicates which, if any, of the plural culling test data buffers are expected to be accessed (e.g. read from and/or written to) by a processing stage (or stages) of the graphics processing pipeline after the early culling (such as, and in an embodiment, the renderer and/or the late culling tester). It will be appreciated that the information may indicate that none, some or all of the plural culling test data buffers are expected to be accessed.

For example, in the case of the plural culling test data buffers comprising a depth buffer and a stencil buffer, the information should, and in an embodiment does, indicate both:

whether or not a processing stage(s) of the graphics processing pipeline after the early culling tester is expected to access the depth buffer; and (separately)

whether or not a processing stage(s) of the graphics processing pipeline after the early culling tester is expected to access the stencil buffer.

The maintained information can comprise, as well as an indication of which, if any, of the plural culling test data buffers are expected to be accessed, any other suitable indications.

In an embodiment, the information comprises dependency tracking information that can be used to determine whether or not a dependency (currently) exists, i.e. whether or not any processing (yet to be completed) by a processing stage(s) of the graphics processing pipeline after the early culling tester (such as, and in an embodiment, the renderer and/or late culling tester) should be completed before the early culling tester performs an early culling test.

In an embodiment, when it is determined that a dependency exists, the early culling test is stalled until the information indicates that the dependency has resolved (i.e. until the processing that had yet to be completed has been completed); whereas when it is not determined that a dependency exists, the early culling test is performed without being stalled.

Thus, in an embodiment, the early culling tester is controlled using the information by:

using the information to determine whether or not to stall an early culling test to be performed by the early culling tester; and when it is determined to not stall the earl culling test, performing the early culling test without stalling; and when it is determined to stall the early culling test:
stalling the early culling test;
using the information to determine when to stop stalling the early culling test; and
when it is determined to stop stalling the early culling test, then performing the early culling test.

The information could function to track dependencies at the granularity of a render output that the graphics processing pipeline is generating as a whole. However, in an embodiment, the information functions to track dependencies (separately) in respect of plural different positions in a (the) render output.

Thus, the determination of whether to stall (and to stop stalling) an early culling test is in an embodiment based on render output position. Thus, the information is in an embodiment used to determine whether or not any processing (yet to be completed) by a processing stage(s) of the graphics processing pipeline after the early culling tester in respect of a particular render output position should be completed before the early culling tester performs an early culling test in respect of the same render output position.

The information could function to track dependencies for individual sampling positions in a render output. However, in an embodiment, the information tracks dependencies for sets of plural sampling positions in a render output. In this case, the sets of plural sampling positions in an embodiment correspond to regularly-sized and shaped, non-overlapping regions of the render output, that are in an embodiment rectangular, and in an embodiment square. In an embodiment, each set of plural sampling positions is a 2×2 block of sampling points. However, other arrangements would be possible.

Thus, in an embodiment, the information comprises an indication of, for each of plural different sets of one or more (in an embodiment plural) sampling positions (e.g. blocks of 2×2 sampling positions), which, if any, of the plural culling test data buffers are expected to be accessed by a processing stage of the graphics processing pipeline after the early culling tester in respect of the set of one or more sampling positions in question.

Thus, the information in an embodiment indicates (separately), for each of plural sets of one or more sampling positions, whether or not a processing stage of the graphics processing pipeline after the early culling tester is expected to access a sampling position of the respective set of sampling positions in the culling test data buffer in question.

In the technology described herein, the information regarding which culling test data buffers are expected to be accessed should be, and in an embodiment is, used when determining whether to stall (and to stop stalling) an early culling test.

The arrangement should be, and in an embodiment is, such that dependencies that relate to different culling test data buffers can be distinguished from each other. Thus, the arrangement should be, and in an embodiment is, such that it can be determined using the information, for example, that the early culling tester should wait until processing by a later processing stage is completed before performing an early culling test that involves accessing a first one of the plural culling test data buffers, but that the early culling tester need not wait until that processing is completed before performing an early culling test that involves accessing a second, different one of the plural culling test data buffers.

Thus, the determination of whether to stall (and to stop stalling) an early culling test to be performed by the early culling tester is in an embodiment based on which, if any, of the plural culling test data buffers the information (currently) is indicating as being expected to be accessed by a processing stage(s) after the early culling tester (in respect of the render output position in question). The determination is in an embodiment also based on which of the plural culling test data buffers the early culling test is expected to access (e.g. based on the selective configuration of the graphics processing pipeline, as discussed above).

In particular, in an embodiment, it is (only) determined that an early culling test should (potentially) be stalled when the information indicates that a processing stage(s) after the early culling tester is expected to access the same culling test data buffer as the early culling test.

Correspondingly, it is in an embodiment determined not to stall an early culling test (and in an embodiment to stop stalling an early culling test) when the information (only) indicates that a processing stage(s) after the early culling tester is expected to access a different culling test data buffer to the early culling test, or when the information indicates that no processing stage after the early culling tester is expected to access the same culling test data buffer as the early culling test.

As discussed above, the test should, and in an embodiment does, also take render output position into account. Thus, in an embodiment, it is (only) determined that an early culling test should (potentially) be stalled when the information indicates that a processing stage(s) after the early culling tester is expected to access the same (set of one or more sampling) position(s) in the same culling test data buffer as the early culling test.

Correspondingly, it is in an embodiment determined not to stall an early culling test (and in an embodiment to stop stalling an early culling test) when the information does not indicate that a processing stage(s) after the early culling tester is expected to access the same (set of one or more sampling) position(s) in the same culling test data buffer as the early culling test, e.g. when the information (only) indicates that a processing stage(s) after the early culling tester is expected to access a different culling test data buffer to the early culling test and/or a different (set of one or more sampling) position(s) in the same culling test data buffer as the early culling test, or when the information indicates that no processing stage after the early culling tester is expected to access the same (set of one or more sampling) position(s) in the same culling test data buffer as the early culling test.

Thus, in an embodiment, using the information to control the early culling tester comprises:
when the early culling tester is to perform an early culling test:
determining whether the information (currently) indicates that a processing stage(s) of the graphics processing pipeline after the early culling tester is expected to access the same (set of one or more sampling) position(s) in the same culling test data buffer as the early culling test; and
when it is determined that the information (currently) indicates that a processing stage(s) of the graphics processing pipeline after the early culling tester is expected to access the same (set of one or more sampling) position(s) in the same culling test data buffer as the early culling test, controlling the early culling tester to stall the early culling test, in an embodiment until the information does not indicate that a processing stage(s) of the graphics processing pipeline after the early culling tester is expected to access the same (set of one or more sampling) position(s) in the same culling test data buffer as the early culling test; and
when it is not determined that the information (currently) indicates that a processing stage(s) of the graphics processing pipeline after the early culling tester is expected to access the same (set of one or more sampling) position(s) in the same culling test data buffer as the early culling test, controlling the early culling tester to perform the early culling test without stalling.

In an embodiment, as well as indicating which culling test data buffers are expected to be accessed, the information (also) indicates how those culling test data buffers are expected to be accessed, i.e. whether or not access of a culling test data buffer is expected to comprise writing to the culling test data buffer and/or whether or not access of a culling test data buffer is expected to comprise reading from the culling test data buffer.

Thus, the information in an embodiment indicates which and how culling test data buffers are expected to be accessed by a processing stage(s) of the graphics processing pipeline after the early culling tester.

Thus, in an embodiment, the information (further) indicates both:
whether or not a processing stage(s) of the graphics processing pipeline after the early culling tester is expected to read from a culling test data buffer; and (separately)
whether or not a processing stage(s) of the graphics processing pipeline after the early culling tester is expected to write to a culling test data buffer.

In an embodiment, the information (further) indicates, for each of plural sets of one or more sampling positions:
whether or not a processing stage(s) of the graphics processing pipeline after the early culling tester is expected to read from a sampling position of the respective set of sampling positions; and (separately)
whether or not a processing stage(s) of the graphics processing pipeline after the early culling tester is expected to write to a sampling position of the respective set of sampling positions.

In this regard, as will be discussed in more detail below, the Applicants have recognised that maintaining and using such (even) "finer grained" read and write information can (further) improve graphics processing efficiency.

It is believed that the idea of maintaining information regarding expected culling test data buffer read and write access may be novel and inventive in its own right.

Thus, a third embodiment of the technology described herein comprises a method of operating a graphics processor that is operable to execute a graphics processing pipeline that comprises plural processing stages including an early culling tester followed by a renderer;

wherein the graphics processor comprises one or more culling test data buffers, wherein each of the one or more culling test data buffers is operable to store a respective set of data values for use by the early culling tester;

the method comprising maintaining information that indicates:

whether or not a processing stage of the graphics processing pipeline after the early culling tester is expected to read from the one or more culling test data buffers; and whether or not a processing stage of the graphics processing pipeline after the early culling tester is expected to write to the one or more culling test data buffers;

the method further comprising using the information to control the early culling tester.

A fourth embodiment of the technology described herein comprises a graphics processor that is operable to execute a graphics processing pipeline that comprises plural processing stages including an early culling tester followed a renderer; the graphics processor comprising:

one or more culling test data buffers, wherein each of the one or more culling test data buffers is operable to store a respective set of data values for use by the early culling tester; and a processing circuit configured to maintain information that indicates:

whether or not a processing stage of the graphics processing pipeline after the early culling tester is expected to read from the one or more culling test data buffers; and whether or not a processing stage of the graphics processing pipeline after the early culling tester is expected to write to the one or more culling test data buffers;

wherein the graphics processor is configured to control the early culling tester using information maintained by the processing circuit.

As will be appreciated by those skilled in the art, these embodiments of the technology described herein can and in an embodiment do include one or more, and in an embodiment all, of the features of the technology described herein, as appropriate. For example, the one or more culling test data buffers may be plural culling test data buffers.

Similarly, the one or more culling test data buffers may comprise a depth buffer and/or a stencil buffer. Thus, in an embodiment, the information indicates:

whether or not a processing stage(s) of the graphics processing pipeline after the early culling tester is expected to read from the depth buffer; and (separately)

whether or not a processing stage(s) of the graphics processing pipeline after the early culling tester is expected to write to the depth buffer; and/or (separately)

whether or not a processing stage(s) of the graphics processing pipeline after the early culling tester is expected to read from the stencil buffer; and (separately)

whether or not a processing stage(s) of the graphics processing pipeline after the early culling tester is expected to write to the stencil buffer.

In these embodiments, the information regarding how culling test data buffers are expected to be accessed (i.e. whether or not read access is expected and/or whether or not write access is expected) should be, and in an embodiment is, used when determining whether to stall (and to stop stalling) an early culling test.

Thus, the determination of whether to stall (and to stop stalling) an early culling test is in an embodiment based on how the information is (currently) indicating a (each) culling test data buffer is expected to be accessed. The determination is in an embodiment also based on how the early culling test is expected to access the same culling test data buffer(s) (e.g. based on the selective configuration of the graphics processing pipeline, as discussed above).

In particular, in an embodiment, it is determined that an early culling test that is expected to write to a culling test data buffer (such as, and in an embodiment, an early culling test for which a result is to be used to determine whether to update the culling test data buffer, e.g. as discussed above) should be stalled when the information indicates that a processing stage(s) after the early culling tester is expected to read from or write to the same (set of one or more sampling) position(s) in the same culling test data buffer that the early culling test is expected to write to. This can then, e.g., avoid the early culling tester writing data to a culling test data buffer that is then erroneously used by a later processing stage.

Similarly, in an embodiment, it is determined that an early culling test that is expected to read from, but not write not, a culling test data buffer (such as, and in an embodiment, an early culling test for which a result is not to be used to determine whether to update the culling test data buffer, e.g. as discussed above) should be stalled when the information indicates that a processing stage(s) after the early culling tester is expected to write to the same (set of one or more sampling) position(s) in the same culling test data buffer that the early culling test is expected to read from. This can then, e.g., avoid the early culling tester reading erroneous data from the culling test data buffer.

However, the Applicants have recognised that an early culling test that reads from, but does not write to, a culling test data buffer can be performed without needing to wait for processing by a later processing stage that involves reading from, but not writing to, the same position in the same culling test data buffer. Thus, in an embodiment, the information is used to control the early culling tester as discussed above, except in such a situation.

Thus, in an embodiment, it is determined not to stall an early culling test that is expected to read from, but not write to, a culling test data buffer (such as, and in an embodiment, an early culling test for which a result is not to be used to determine whether to update the culling test data buffer, e.g. as discussed above) when the information indicates that a processing stage(s) after the early culling tester is expected to read from, but not write to, the same (set of one or more sampling) position(s) in the same culling test data buffer that the early culling test is expected to read from.

Thus, in an embodiment, using the information to control the early culling tester (further) comprises:

when the early culling tester is to perform an early culling test that is expected to read from, but not write to, a culling test data buffer:

determining whether the information (currently) indicates that a processing stage(s) of the graphics processing pipeline after the early culling tester is expected to read from, but not write to, the same (set of one or more sampling) position(s) in the same culling test data buffer as the early culling test is expected to read from; and when it is determined that the information (currently) indicates that that a processing stage(s) of the graphics processing pipeline after the early culling tester is expected to read from, but not write to, the same (set of one or more sampling) position(s) in the same culling test data buffer as the early culling test is expected to read from, controlling the early culling tester to perform the early culling test without stalling.

The information of the embodiments of the technology described herein can be provided in any suitable and desired form, and maintained in any suitable and desired manner.

In an embodiment, it is determined which and/or how culling test data buffers are expected to be accessed for the purposes of processing a fragment (or set of fragments, e.g. draw call) before the fragment (or set of fragments, e.g. draw call) undergoes that processing.

Thus, in an embodiment, it is determined which and/or how culling test data buffers are expected to be accessed for the purposes of at least some fragment processing; the information is updated to indicate which and/or culling test data buffers have been determined as being expected to be accessed; and then at least some of the fragment processing is performed.

Thus, the information in an embodiment indicates which and/or how culling test data buffers have been determined as being expected to be accessed by a processing stage of the graphics processing pipeline after the early culling tester.

It can be determined which and/or culling test data buffers are expected to be accessed in any suitable and desired manner. In an embodiment, runtime information and/or descriptor information (such as, and in an embodiment, draw call descriptor information) is used to determine an expectation of which and/or how culling test data buffers will be accessed. In an embodiment, the runtime information comprises information from the hierarchical rasterisation and/or patch testing process.

The information can be updated to indicate which and/or how culling test data buffers have been determined as being expected to be accessed in any suitable and desired manner. The information should be, and in an embodiment is, updated (maintained) such that it indicates a current expectation regarding which and/or how culling test data buffers may be accessed.

In an embodiment, the information is updated (maintained) so as to indicate that a culling test data buffer is expected to be accessed (read from and/or written to) by a processing stage after the early culling tester when there is at least one fragment that is (currently) being processed after the early culling tester in the graphics processing pipeline whose processing has been determined as being expected to comprise accessing (reading from and/or writing to) the culling test data buffer (in respect of a particular render output position).

Correspondingly, the information is in an embodiment updated (maintained) so as to indicate that a culling test data buffer is not expected to be accessed (read from and/or written to) by a processing stage after the early culling tester when there are no fragments that are (currently) being processed after the early culling tester in the graphics processing pipeline whose processing has been determined as being expected to comprise accessing (reading from and/or writing to) the culling test data buffer (in respect of a particular render output position).

Thus, the information should, and in an embodiment does, indicate which and/or how culling test data buffers are expected to be accessed for the purposes of processing one or more first fragments that are currently after the early culling tester in the graphics processing pipeline; and the information should be, and is in an embodiment, used to control early culling testing on one or more second (later) fragments that are currently being processed by the early culling tester.

In an embodiment, the information is updated appropriately when a fragment that could create a dependency is passed onward from the early culling tester, i.e. when a fragment is passed onward from the early culling tester and there is at least some processing for the fragment that is yet to be completed and which may need to be completed before an early culling test on another fragment is performed. The information is in an embodiment also updated appropriately when a fragment can no longer create a dependency, i.e. when the processing that had yet to be completed is completed and/or when processing of the fragment is terminated (e.g. culled).

In an embodiment, the information comprises an indication of a number of fragments (currently) after the early culling tester in the graphics processing pipeline that could create a dependency. Thus, in an embodiment, the information comprises one or more counters, wherein each counter counts a number of fragments (currently) after the early culling tester in the graphics processing pipeline that could create a dependency.

In an embodiment, the information comprises, for each render output tracking position (set of one or more sampling position(s)), one or more counters associated with the render output tracking position in question. In this case, a counter associated with a particular render output tracking position (set of one or more sampling position(s)) in an embodiment counts fragments corresponding to that render output tracking position (set of one or more sampling position(s)).

In this case, updating the information in an embodiment comprises incrementing and/or decrementing a counter (or counters) (corresponding to the render output tracking position (set of one or more sampling position(s)) in question) as appropriate. In an embodiment, a counter (or counters) is incremented when a fragment that could create a dependency is passed onward from the early culling tester, and correspondingly a counter (or counters) is in an embodiment decremented when a fragment can no longer create a dependency, e.g. when processing that had yet to be completed is completed and/or when processing of the fragment is terminated (e.g. when the fragment is "culled").

In this case, determining whether to stall (and whether to stop stalling) an early culling test in an embodiment comprises determining whether an (each) appropriate counter is zero (or whether an appropriate counter is greater than zero). In an embodiment, a counter being zero indicates that a dependency does not (could not) (currently) exist, whereas a counter being greater that zero indicates that a dependency could exist. Correspondingly, a counter becoming zero in an embodiment indicates that a dependency has resolved.

Thus, it is in an embodiment determined to stall an early culling test when at least one appropriate counter is greater than zero. Correspondingly, it is in an embodiment determined not to stall (or to stop stalling) an early culling test when all appropriate counters are zero.

The information can indicate which and/or how culling test data buffers are expected to be accessed in any suitable and desired manner.

In an embodiment, the information comprises separate sets of dependency tracking data, each set of dependency tracking data being associated with a respective one of the plural culling test data buffers. In this case, each set of dependency tracking data in an embodiment comprises a respective set of one or more counters, each counter in a set of counters being associated with a respective one of the plural different render output tracking positions (sets of one or more sampling position(s)) (e.g. as described above).

In this case, a fragment whose processing is (determined to be) expected to comprise accessing a particular culling test data buffer is assigned to (counted by) the set of dependency tracking data associated with the culling test data buffer in question.

In an embodiment, each separate set of dependency tracking data is (further) associated with either reading data from a culling test data buffer or writing data to a culling test data buffer. In this case, a fragment whose processing is (determined to be) expected to comprise reading from a particular culling test data buffer is assigned to (counted by) the set of dependency tracking data associated with reading from the culling test data buffer in question, and a fragment whose processing is (determined to be) expected to comprise writing to a particular culling test data buffer is assigned to (counted by) the set of dependency tracking data associated with writing to the culling test data buffer in question.

Thus, for example and in an embodiment, in the case of depth and stencil buffers, the information comprises at least one set of dependency tracking data (e.g. set of one or more counters) associated with the depth buffer, and at least one set of dependency tracking data (e.g. set of one or more counters) associated with the stencil buffer. In an embodiment, the information comprises a set of dependency tracking data (e.g. set of one or more counters) associated with reading from the depth buffer, a set of dependency tracking data (e.g. set of one or more counters) associated with writing to the depth buffer, a set of dependency tracking data (e.g. set of one or more counters) associated with reading from the stencil buffer, and a set of dependency tracking data (e.g. set of one or more counters) associated with writing to the stencil buffer. Thus, the information in this case in an embodiment comprises, for each respective render output tracking position (set of one or more sampling position(s)), four respective counters.

In these embodiment, the appropriate separate set (or sets) of dependency tracking data (counters) is (are) used when determining whether to stall (and to stop stalling) an early culling test, e.g. as described above.

In an embodiment, the separate sets of dependency tracking data (e.g. sets of one or more counters) are used to determine whether or not there could be a dependency, and which and/or how culling test data buffers are expected to be accessed.

In another embodiment, the information comprises a single, combined set of dependency tracking data (e.g. set of one or more counters), together with association information that indicates which culling test data buffers the combined set of dependency tracking data is associated with (is tracking), and/or in an embodiment whether the combined set of dependency tracking data is associated with reading from and/or writing to a culling test data buffer.

In this case, a fragment whose processing is (determined to be) expected to comprise accessing any culling test data buffer is assigned to (counted by) the combined set of dependency tracking data. The association information is then in an embodiment updated based on which and/or how culling test data buffers are expected to be accessed.

In this case, the association information in an embodiment comprises a set of plural flags, each flag being associated with a respective one of the culling test data buffers, and/or in an embodiment with either reading from or writing to a culling test data buffer.

Thus, for example and in an embodiment, in the case of depth and stencil buffers, the association information comprises at least one flag associated with the depth buffer, and at least one flag associated with the stencil buffer. In an embodiment, the information comprises a flag associated with reading from the depth buffer, a flag associated with writing to the depth buffer, a flag associated with reading from the stencil buffer, and a flag associated with writing to the stencil buffer. Thus, the information in this case in an embodiment comprises four flags and one respective counter for each respective render output tracking position (set of one or more sampling position(s)).

In these embodiment, the combined set of dependency tracking data and the association information are used when determining whether to stall (and to stop stalling) an early culling test, e.g. as described above.

In an embodiment, the combined set of dependency tracking data (e.g. set of one or more counters) is used to determine whether or not there could be a dependency, and the association information (e.g. set of plural flags) is then used to determine which and/or how culling test data buffers are expected to be accessed.

In some embodiments, the graphics processing pipeline comprises, and/or is in communication with, one or more memories and/or memory devices that store the data described herein and/or store software for performing the processes described herein. The graphics processing pipeline may also be in communication with a host microprocessor, and/or with a display for displaying images based on the data generated by the graphics processing pipeline.

The graphics processing pipeline is in an embodiment implemented and executed by a graphics processor (graphics processing unit) that includes appropriate functional units for executing the stages of the graphics processing pipeline. In an embodiment, the graphics processor is a (single) integrated circuit. The graphics processing pipeline stages may be implemented via fixed function units (hardware) of the graphics processing unit and/or by appropriately programmed programmable functional units of the graphics processing unit, as desired.

As will be appreciated from the above, the graphics processing pipeline is in an embodiment part of a graphics processing system that includes a host processor (central processing unit (CPU)) that may be, and is in an embodiment, operable to execute applications that can require graphics processing by the graphics processing pipeline (GPU), and that will send appropriate commands and data to the graphics processing pipeline (GPU) to control it to perform graphics processing operations and to produce graphics processing (render) output required by applications executing on the host processor (including in the manner of the technology described herein).

To facilitate this, the host processor should, and in an embodiment does, also execute a driver for the graphics processing pipeline (graphics processing unit) that will be operable to receive and interpret commands and data received from an application executing on the host processor for graphics processing operations and to convert those commands and data to appropriate commands and data for provision to the graphics processing pipeline (GPU) so as to cause the graphics processing pipeline to perform the desired graphics processing operation.

The host processor in an embodiment also executes a compiler or compilers for compiling shader programs to be executed by programmable shading stages of the graphics processing pipeline (GPU) (which compiler may be, and in an embodiment is, a part of the driver).

The graphics processing system correspondingly in an embodiment comprises one or more memories and/or memory devices for storing the data described herein and/or for storing software for performing the processes described herein. It in an embodiment also comprises a display for displaying images based on the data generated by the graphics processing pipeline.

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

Correspondingly, although the technology described herein has primarily been described above with reference to the processing of a given fragment, as will be appreciated by those skilled in the art, the technology described herein may be, and is in an embodiment, applied to plural fragments that are to be processed, e.g. to each fragment of a draw call, and to each draw call of a render output to be generated, and so on.

Thus, the technology described herein is in an embodiment used to configure and control the performing of early culling tests when processing primitives and fragments to generate a useful render output, such as, and in an embodiment a frame (image) for display.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems. Thus, in an embodiment, the graphics processing system is a tile-based graphics processing system.

In an embodiment, the various functions of the technology described herein are carried out on a single data processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and units of the technology described herein may comprise a suitable processor or processors, controller or controllers, functional units, circuitry/circuit(s), processing logic, microprocessor arrangements, etc., that are operable to perform the various functions, etc., such as appropriately dedicated hardware elements (processing circuitry/circuit(s)) and/or programmable hardware elements (processing circuitry/circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuit(s), etc., if desired.

Subject to any hardware necessary to carry out the specific functions discussed above, the graphics processing system and pipeline can otherwise include any one or more or all of the usual functional units, etc., that data processing systems and pipelines include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising a data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

DETAILED DESCRIPTION

A number of embodiments of the technology described herein will now be described.

FIG. 1 shows a typical graphics processing system. An application 2, such as a game, executing on a host processor 1 will require graphics processing operations to be performed by an associated graphics processing unit (GPU) (graphics processor) 3. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows a graphics processing pipeline 33 that may be executed by the graphics processor 3.

The graphics processing pipeline 33 shown in FIG. 2 is a tile-based renderer and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The render output data array may typically be an output frame intended for display on a display device, such as a screen or printer, but may also, for example, comprise intermediate data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

FIG. 2 shows the main elements and pipeline stages of the graphics processing pipeline 33 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuit(s) and/or processing logic, etc., for performing the necessary operation and functions.

As shown in FIG. 2, the graphics processing pipeline 33 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 33. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 33.

The rasterisation stage 25 of the graphics processing pipeline 33 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 can perform a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test can be carried out.

Fragments that pass (or that are not subjected to) the fragment early Z and stencil test stage 26 are then sent to the fragment shading stage (renderer) 27. The fragment shading stage 27 performs the appropriate fragment processing operations on the fragments, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by appropriately comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. The tile buffer stores colour and depth buffers that store an appropriate colour, etc., or Z-value, respectively, for each sampling point that the buffers represent (in essence for each sampling point of a tile that is being processed). These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). The display device could comprise, e.g., a display comprising an array of pixels, such as a computer monitor or a printer.

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 33 would be possible.

Figure 3:
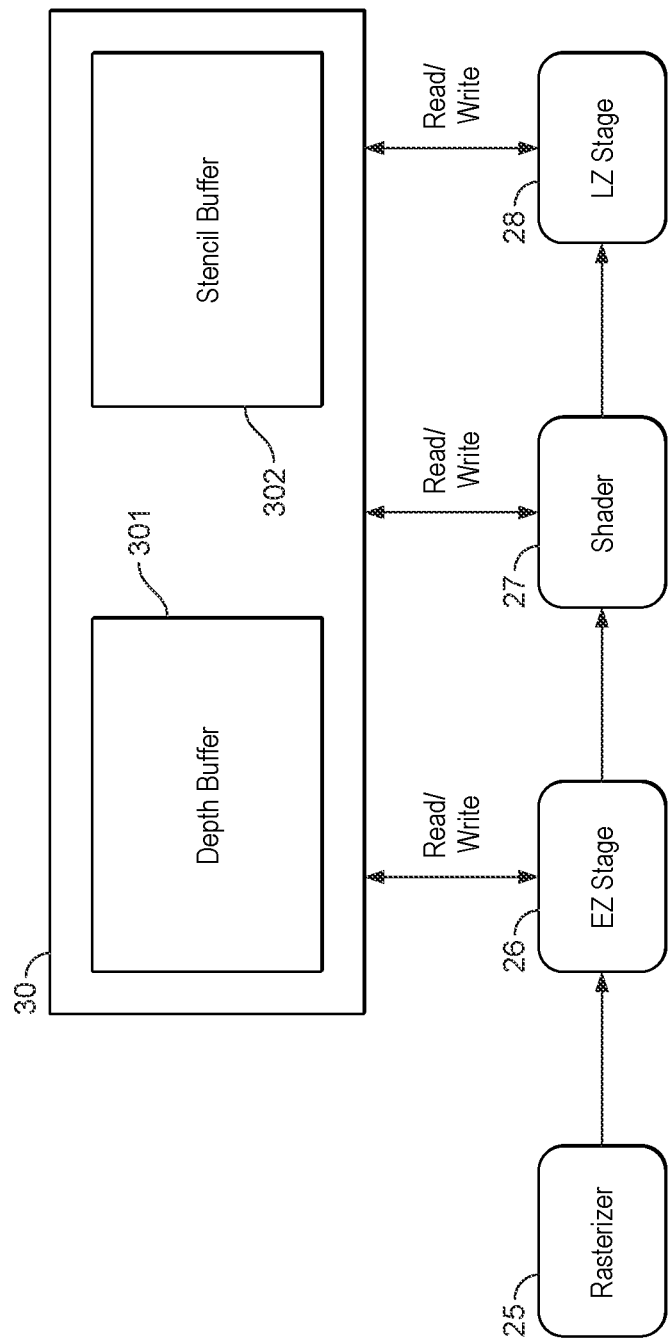
FIG. 3 shows schematically a graphics processing pipeline.

FIG. 3 shows schematically the depth and stencil testing arrangement of the graphics processing pipeline 33 shown in FIG. 2 in more detail.

FIG. 3 shows schematically the pipeline stages after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 3.

As shown in FIG. 3, this part of the fragment processing pipeline of the graphics processor 3 includes a number of processing stages, including the rasterisation stage 25, the early ZS (depth and stencil) stage 26, a rendering stage in the form of a fragment shading stage 27, and the late ZS (depth and stencil) test stage 28.

The rasterisation stage 25 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives. In the present embodiment, each graphic fragment that is generated by the rasteriser 25 represents (has associated with it) plural (and normally 4) sampling positions. (Other arrangements would be possible). Each graphics fragment has associated with it a coverage mask indicating which sampling points of the plural sampling positions that the fragment represents, it is actually being used to render (i.e. are actually covered by the primitive in question).

The rasteriser 25 issues the fragments it has generated to the remainder of the graphics processing pipeline for processing.

The first part of this processing is that each fragment issued (output) by the rasteriser 25 can be subjected to an early culling (depth and/or stencil) test in the early depth and stencil test stage 26. This early depth and stencil test stage 26 performs depth and stencil tests on the individual (covered) sampling positions associated with the fragments issued by the rasteriser 25 (i.e. at a per-sampling point resolution).

To do this, the early depth and stencil tester 26 uses per-sampling position depth values stored in a depth (Z) buffer 301 that is part of the tile buffer 30 and per-sampling position stencil values (e.g. bits) stored in a stencil (S) buffer 302 that is part of the tile buffer 30. Thus, the depth and stencil buffers 301, 302 store an appropriate depth (Z) value and stencil (S) (e.g. bit) value, respectively, for each sampling point that the buffer represents (essentially for each sampling point position of the tile that is being processed). These values may be stored in the depth and stencil buffers 301, 302 when sampling points being tested by the early depth and stencil testing stage 26 and the late depth and stencil testing stage 28 pass the respective depth and stencil tests, and/or at the fragment shading stage 27.

Fragments that pass the early depth and stencil test stage 26 (i.e. fragments having at least one associated sampling position that passes the early depth and stencil test stage 26), or that are not subjected to the early depth and stencil test stage 26, are then sent onwards to the fragment shading stage 27 (the renderer).

(Fragments that fail the early depth and stencil test stage 26 are culled by the early depth and stencil test stage 26.)

The fragment shading stage 27 performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. The fragment processing may also involve accessing (reading from and/or writing to) the depth buffer 301 and/or stencil buffer 302.

In the present embodiment, the fragment shading stage 27 is in the form of a shader pipeline (a programmable fragment shader). The fragment shading stage 27 is a processing stage that performs graphics processing by running a small program for each sampling position that is to be processed. For each sampling position to be processed, an execution thread that will execute the corresponding shader program is issued to appropriate programmable processing circuit(s) that then executes the shader program for the execution thread in question.

The sampling positions (and thus accordingly their corresponding execution threads) may be organised into and processed as groups of plural sampling positions (and thus threads), each corresponding to the sampling positions associated with a set of one or more graphics fragments. In the present embodiment, the sampling positions are organised into 2×2 blocks of sampling position "quads". Groups of one or more "quads" (corresponding e.g. to a fragment) are then processed in the fragment shading stage 27 as respective thread groups ("warps"), with the threads in a thread group ("warp") executing the fragment shader program in lockstep, one instruction at a time. Other groupings of threads would be possible.

Grouping execution threads in this manner can improve shader program execution efficiency because it is possible to share instruction fetch and scheduling resources between all the threads in the group.

There is then a "late" fragment Z and stencil test stage 28, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 30 (i.e. determines whether the fragment data for the fragments issuing from the fragment shading stage 27 should be stored in the tile buffers (should replace or modify the fragment data in the tile buffer(s) of the fragments that have already been rendered)).

To do this, the late depth and stencil tester 28 may again use the per-sampling position depth values stored in the depth (Z) buffer 301 and per-sampling position stencil values stored in the stencil (S) buffer 302. The late depth test stage 28 may compare the depth values of (associated with) the fragments issued from the fragment shading stage 27 with the (per-sampling position) depth values stored in the depth buffer 30 for the sampling positions in question (in the appropriate manner). The depth (Z) values for sampling points that pass the late depth test 28 are also written appropriately to the depth (Z) buffer 301 to update it.

This late fragment depth and stencil test stage 28 may also carry out any necessary "late" alpha and/or stencil tests on the fragments.

The fragments that pass (or that do not undergo) the late fragment test stage 28 are then subjected to any remaining operations necessary on the fragments, such as blending with the framebuffer, dither etc. (not shown).

Finally, the output fragment data values are written to the appropriate tile buffers 30 that store an appropriate, e.g. colour, value for each sampling point that the buffers represent (in essence for each sampling point of the tile that is being processed).

Once each tile has been processed, its data is, e.g., exported from the tile buffers 30 to a main memory (e.g. to a frame buffer in a main memory) (not shown) for storage, and the next tile is then processed, and so on, until sufficient tiles have been processed to generate the entire render output (e.g. frame (image) to be displayed).

While it would be possible to have every fragment issued by the rasteriser 25 undergo the early culling test 26 (and/or undergo both the early culling test 26 and the late culling test 28), in the present embodiment, fragments are selectively controlled to undergo either one or both of the early and late culling tests, and, moreover, are selectively controlled whether or not to undergo a culling test for the purposes of determining whether to cull (kill) the fragment from further processing, and whether or not to undergo a culling test for the purposes of determining whether to update a culling buffer with data for the fragment.

In the present embodiment, this is achieved by providing for each fragment a set of state information that indicates whether the fragment is to undergo the early and/or late culling test, whether the fragment is to undergo a culling test for the purposes of determining whether to cull (kill) the fragment, and whether the fragment is to undergo a culling test for the purposes of determining whether to update a culling buffer. This state information is provided by the driver 4 on a per draw call basis (for a draw call), based on the graphics processing operation or operations that is required by the application 2. The state is then used by the graphics processing pipeline 33 to determine and control how the fragment is tested. The arrangement in this regard is in an embodiment as described in US 2018/349315.

The above describes certain features of the operation of the graphics processing system shown in FIGS. 1, 2 and 3. Further features of the operation of the graphics processing system shown in FIGS. 1, 2 and 3 in accordance with embodiments of the technology described herein will now be described.

The present embodiments relate to the situation in which an early culling (depth and/or stencil) test on a fragment is performed only after waiting for any dependency of the fragment to resolve, i.e. a "force early" mode of operation as described US 2018/349315. As discussed above and in US 2018/349315, such a dependency may occur when an early culling test for a fragment for a given sampling position cannot be performed until processing for an earlier fragment for that position in the render output has been completed.

Figure 4:
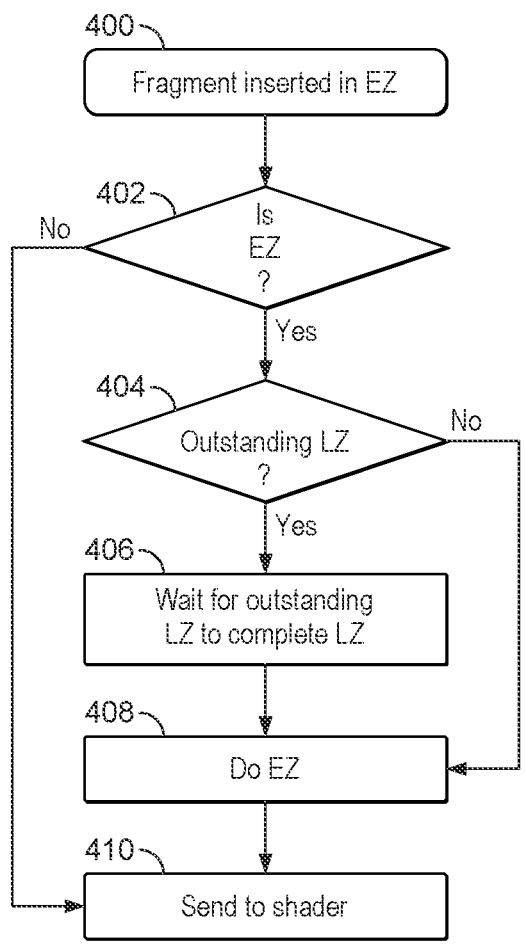
FIG. 4 shows schematically a method of operating a graphics processing pipeline.

FIG. 4 illustrates a process for ensuring that any dependency is resolved before the early depth and stencil testing stage 26 performs an early culling (depth and/or stencil) test according to the present embodiments.

As shown in FIG. 4, when (at step 400) a fragment is received by the early depth and stencil testing stage 26, it is determined (at step 402), based on state information associated with the fragment, whether or not the fragment is to be subjected to an early culling test by the early depth and stencil testing stage 26.

If it is determined that the fragment is not to be subjected to an early culling test, the fragment is sent to the fragment shading stage (renderer) 27 for shading (at step 410) without being subjected to an early culling test by the early depth and stencil testing stage 26.

In the present embodiments, a fragment can be subjected to an early culling test or to a late culling test, but not both. Thus, a fragment that is sent to the fragment shading stage 27 without being subjected to an early culling test may undergo a late culling test in the late depth and stencil testing stage 28, and as such may create a dependency for any subsequent (later) fragments that cover the same position(s) as the (earlier) fragment in the render output and that are received by the early depth and stencil testing stage 26 before the (earlier) fragment has completed its processing in the late depth and stencil testing stage 28. Correspondingly, any dependency created by such a fragment will be resolved once the fragment has completed its processing in the late depth and stencil testing stage 28.

Other ways of dependencies being created and resolved would be possible. For example, a dependency could result from a fragment being subjected to both early and late culling tests and/or as a result of the fragment shading stage 27 accessing the depth buffer 301 and/or stencil buffer 302.

Returning to FIG. 4, if (at step 402) it is determined that the fragment is to be subjected to an early culling test by the early depth and stencil testing stage 26, then it is determined (at step 404) whether or not there is a dependency in respect of the fragment's position that needs to be resolved before the early culling test is performed.

If it is determined that there is no dependency that needs to be resolved before the early culling test is performed, the early depth and stencil testing stage 26 performs the early culling test (at step 408) (without waiting for a dependency to resolve), and if the fragment passes the early culling test, the fragment is sent to the fragment shading stage 27 for shading (at step 410). If the fragment fails the early culling test, it is culled.

If (at step 404) it is determined that there is a dependency that needs to be resolved before the early culling test is performed, then the early culling test is stalled (at step 406) until the dependency is resolved. Then, once the dependency is resolved, the early depth and stencil testing stage 26 performs the early culling test (at step 408), and if the fragment passes the early culling test, it is sent to the fragment shading stage 27 for shading (at step 410). If the fragment fails the early culling test, it is culled.

Figure 5:
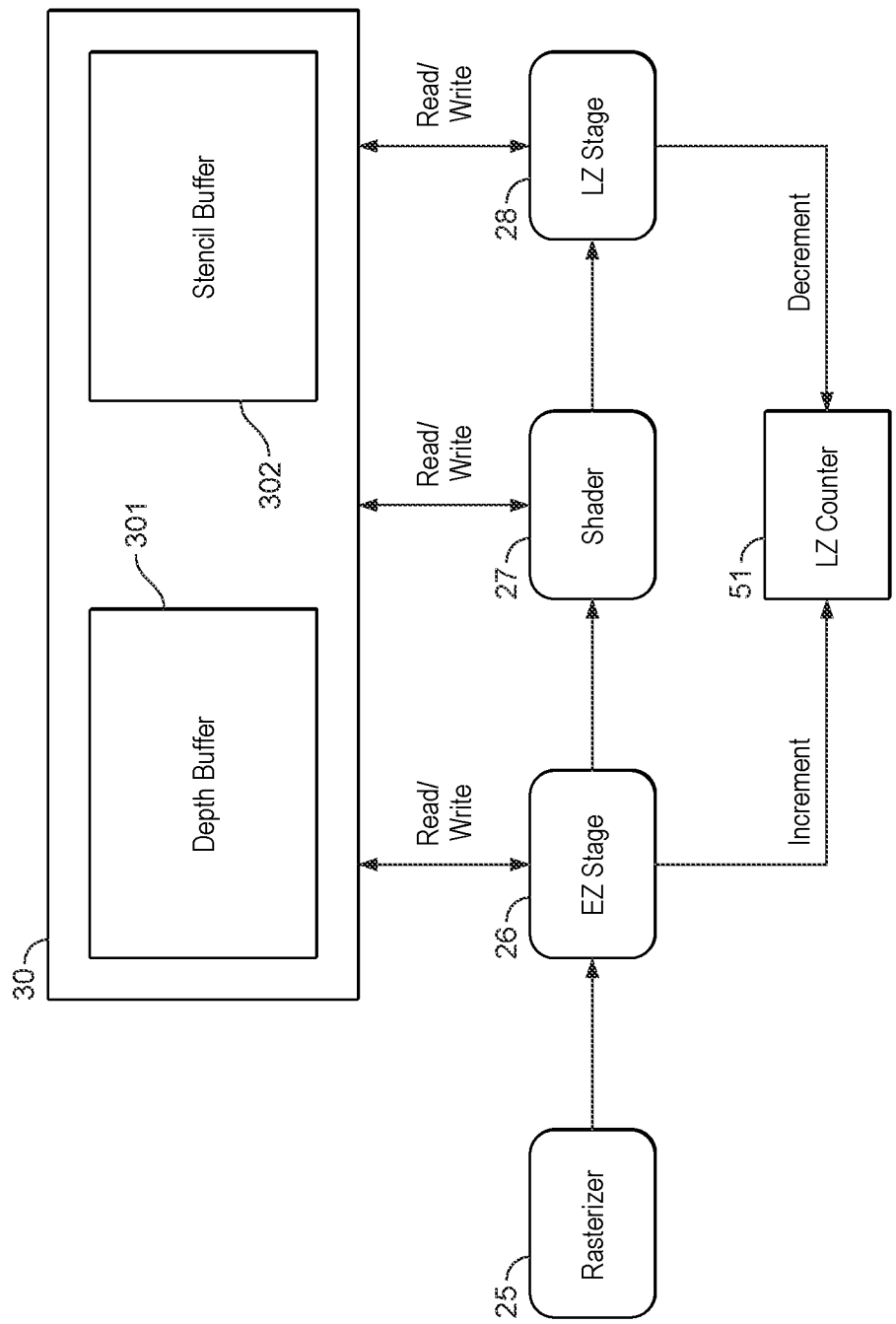
FIG. 5 shows schematically a graphics processing pipeline.

FIGS. 5 and 6 illustrate one way that the process of FIG. 4 can be implemented in the graphics processing system shown in FIGS. 1, 2 and 3. As illustrated in FIG. 5, in this arrangement, the graphics processor 3 includes a dependency tracking stage (processing circuit) 51 that the early and late depth and stencil testing stages 26, 28 can communicate with.

The dependency tracking circuit 51 operates to track those fragment positions in the render output for which a dependency that could need to be resolved exists. To do this, the dependency tracking stage 51 maintains a set of plural counters, with each counter in the set of counters being associated with a respective position (or positions) in the render output.

In the present arrangement, the render output is divided into 2×2 blocks of adjacent sampling positions ("quads"), and the dependency tracking stage 51 maintains one counter for each such 2×2 block of adjacent sampling positions ("quad"). When a counter is zero, that indicates that there is (currently) no dependency in respect of the position(s) associated with the counter to be resolved, whereas when a counter is greater than zero, that indicates that there is (currently) a dependency in respect of the position(s) associated with the counter that could need to be resolved.

The counters maintained by the dependency tracking stage 51 are used to determine whether there is a dependency that needs to be resolved before an early culling (depth and/or stencil) test is performed by the early depth and stencil testing stage 26. This is illustrated in FIG. 6A.

Figure 6A:
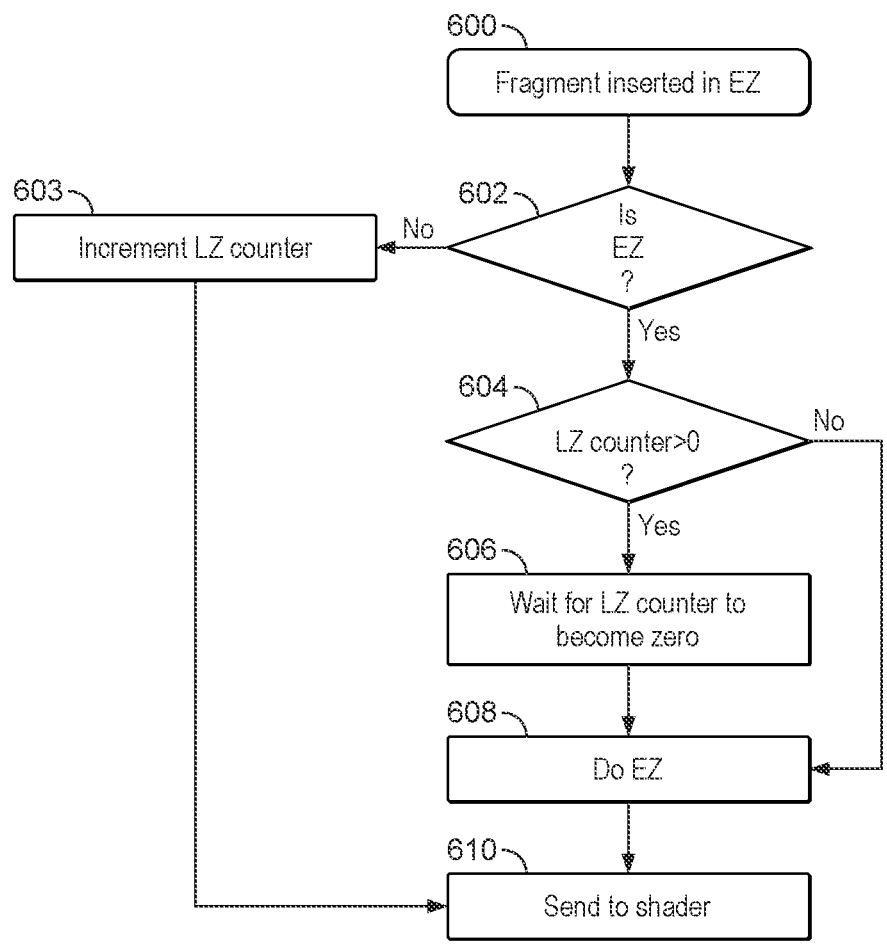
FIGS. 6A and 6B show schematically a method of operating a graphics processing pipeline.

As shown in FIG. 6A, in the present arrangement, when (at step 600) a fragment is received by the early depth and stencil testing stage 26, it is determined (at step 602) whether or not the fragment is to be subjected to an early culling test by the early depth and stencil testing stage 26.

If it is determined that the fragment is not to be subjected to an early culling test, then the fragment is sent to the fragment shading stage 27 for shading (at step 610) without being subjected to an early culling test by the early depth and stencil testing stage 26.

As discussed above, a fragment that is sent to the fragment shading stage 27 in this manner may create a dependency. Thus, as shown in FIG. 6A, when a fragment is sent to the fragment shading stage 27 for shading (at step 610) without being subjected to an early culling test, the counter of the set of counters maintained by the dependency tracking stage 51 which corresponds to the fragment's position is incremented (at step 603).

If, on the other hand, it is determined that the fragment is to be subjected to an early culling test by the early depth and stencil testing stage 26, then it is determined (at step 604) whether or not the counter corresponding to the fragment's position is (currently) greater than zero.

If it is determined that the counter is zero, then that indicates that there is no dependency for that fragment position that needs to be resolved before the early culling test is performed, and so the early depth and stencil testing stage 26 performs the early culling test on the fragment (at step 608) (without waiting for any dependency to resolve), and if the fragment passes the early culling test, it is sent to the fragment shading stage 27 for shading (at step 610). If the fragment fails the early culling test, it is culled.

If (at step 604) it is determined that the counter is greater than zero, then that indicates that there is a dependency that needs to be resolved before the early culling test is performed, and so, in this case, the early culling test is stalled (at step 606) until that dependency is resolved, as indicated by the counter becoming zero. Then, once the counter becomes zero (indicating that the dependency is resolved), the early depth and stencil testing stage 26 performs the early culling test (at step 608), and if the fragment passes the early culling test, it is sent to the fragment shading stage 27 for shading (at step 610). If the fragment fails the early culling test, it is culled.

Figure 6B:
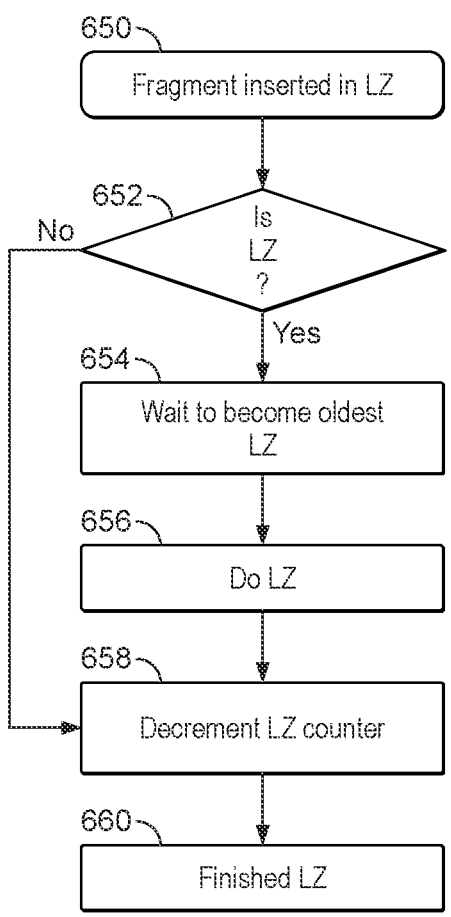

FIG. 6B illustrates the corresponding dependency tracking resolving process according to this arrangement. As discussed above, in this arrangement, a dependency created by a fragment is resolved once the fragment has completed its processing in the late depth and stencil testing stage 28.

As shown in FIG. 6B, when (at step 650) a fragment is received by the late depth and stencil testing stage 28, it is determined (at step 652) whether or not the fragment is to be subjected to a late culling test.

If it is determined that the fragment is not to be subjected to a late culling test, then the counter of the set of counters which corresponds to the fragment's position is decremented (at step 658), and the fragment has then completed its processing in the late depth and stencil testing stage 28 (at step 660). The fragment is then passed to the remainder of the graphics processing pipeline, e.g. for output.

If, on the other hand, it is determined that the fragment is to be subjected to a late culling test, then when the fragment becomes the oldest fragment that the late depth and stencil testing stage 28 is to perform a late culling test on (at step 654), the late depth and stencil testing stage 28 performs the late culling test on the fragment (at step 656), and then the counter corresponding to the fragment's position is decremented (at step 658). The fragment has then completed its processing in the late depth and stencil testing stage 28 (at step 660). If the fragment passes the late culling test, it is passed to the remainder of the graphics processing pipeline, e.g. for output. If the fragment fails the late culling test, it is culled.

Figure 7:
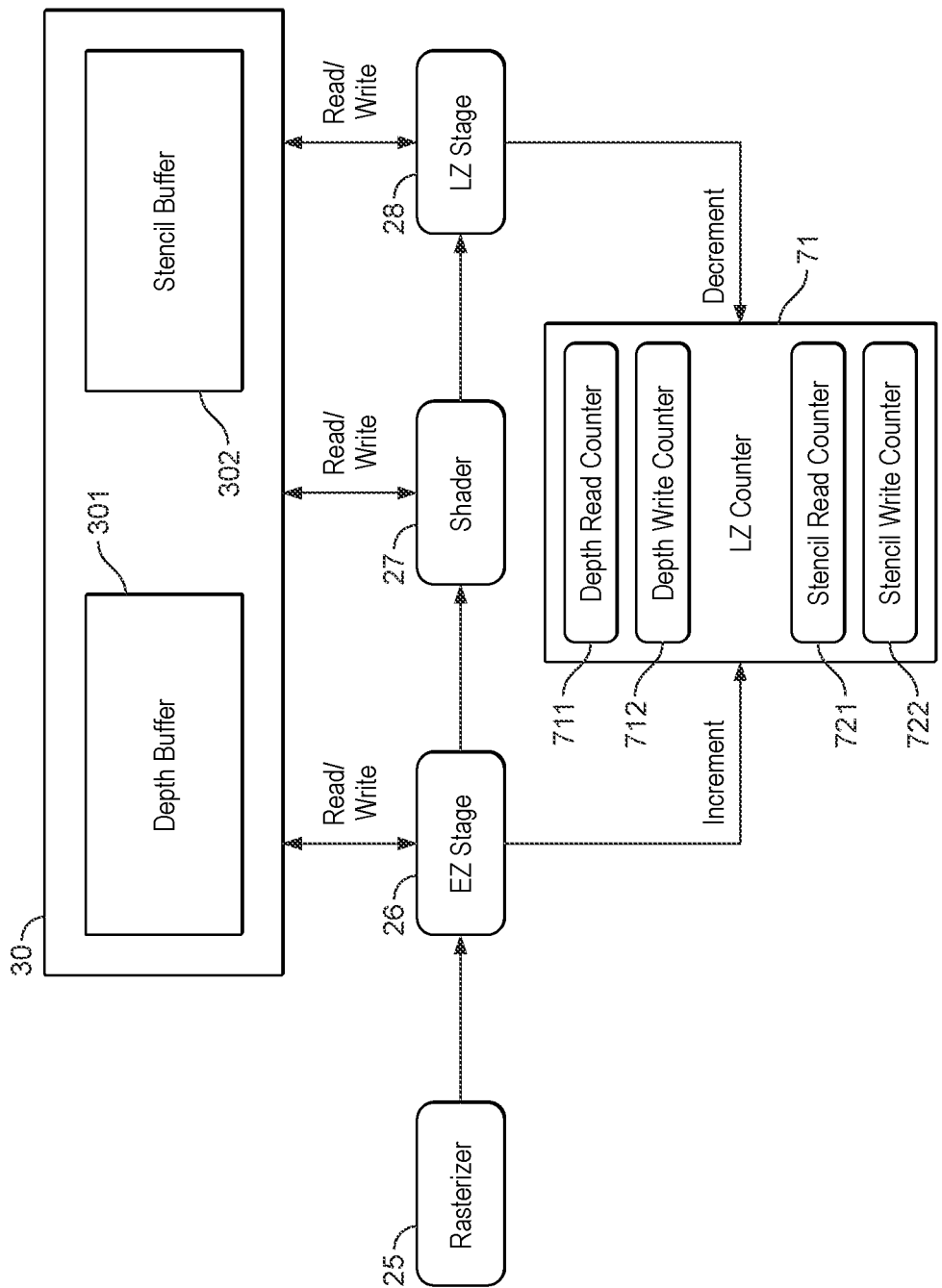
FIG. 7 shows schematically a graphics processing pipeline.

FIGS. 7 and 8 illustrate a dependency tracking arrangement according to an embodiment of the technology described herein. As illustrated in FIG. 7, in this embodiment, as in the arrangement of FIG. 5, the graphics processor 3 includes a dependency tracking stage (processing circuit) 71 that the early and late depth and stencil testing stages 26, 28 can communicate with.

However, the dependency tracking circuit 71 of the embodiment of FIG. 7 operates to track dependencies in a finer grained manner as compared to the arrangement of FIG. 5. In particular, in contrast to the arrangement of FIG. 5, the dependency tracking stage 71 of FIG. 7 can track dependencies that relate to depth buffer 301 access and dependencies that relate to stencil buffer 302 access separately. Moreover, the dependency tracking stage 71 can track dependencies that relate to buffer read access and dependencies that relate to buffer write access separately.

To do this, in the present embodiment, dependency tracking stage 71 maintains plural sets of plural counters. In particular, as shown in FIG. 7, dependency tracking stage 71 maintains a set of plural depth read counters 711, a set of plural depth write counters 712, a set of plural stencil read counters 721, and a set of plural stencil write counters 722. Each counter in a set of plural counters is associated with a respective position (or positions) in the render output.

In the present embodiment, the render output is divided into 2×2 blocks of adjacent sampling positions ("quads"), and the dependency tracking stage 71 maintains one counter in each set of counters for each such 2×2 block of adjacent sampling positions ("quad"). Thus, for each 2×2 block of adjacent sampling positions ("quad") in the render output, the dependency tracking stage 71 maintains a respective depth read counter, a respective depth write counter, a respective stencil read counter, and a respective stencil write counter. Dividing the render output in a different manner would be possible.

The counters maintained by the dependency tracking stage 71 are then used to determine whether there is any dependency that needs to be resolved before an early culling (depth and/or stencil) test is performed by the early depth and stencil testing stage 26. This is illustrated in FIG. 8A.

Figure 8A:
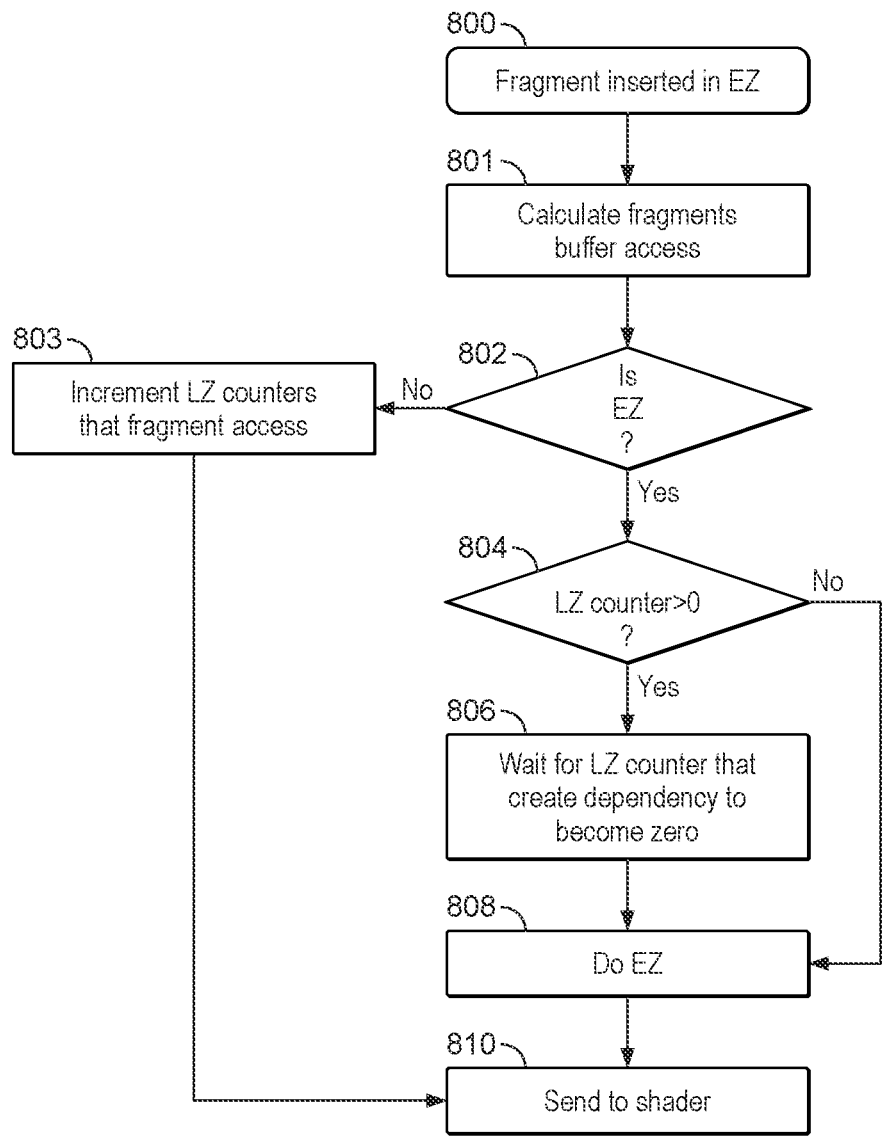
FIGS. 8A, 8B, 8C and 8D show schematically a method of operating a graphics processing pipeline.

As shown in FIG. 8A, when (at step 800) a fragment is received by the early depth and stencil testing stage 26, any culling buffers (i.e. depth buffer 301, stencil buffer 302) that are expected to be accessed, and the manner in which those culling buffers are expected to be accessed (i.e. read or write access), for the purposes of the processing of that fragment are determined (at step 801). For example, the depth buffer 301 and/or stencil buffer 302 may be accessed (read from and/or written to) for the purposes of performing a late culling test on a fragment, and/or when shading (rendering) the fragment in the fragment shading stage 27. This determining of a culling buffer access "pattern" is illustrated in more detail in FIG. 8B.

Figure 8B:
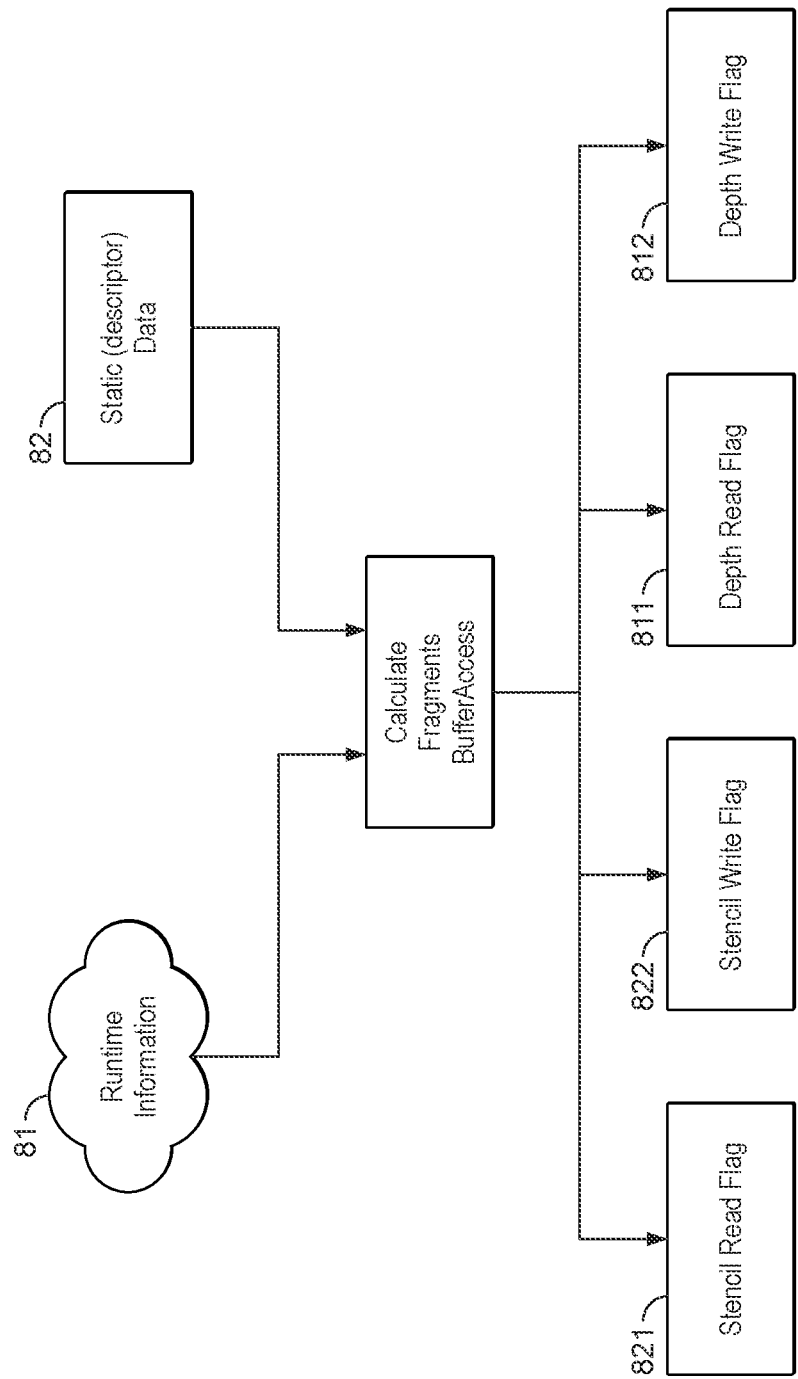

As shown in FIG. 8B, runtime information 81 and descriptor information 82 is used to determine whether or not processing of a fragment is expected to involve reading depth data from the depth buffer 301, whether or not processing of the fragment is expected to involve writing depth data to (updating) the depth buffer 301, whether or not processing of the fragment is expected to involve reading stencil data from the stencil buffer 302, and whether or not processing of the fragment is expected to involve writing stencil data to (updating) the stencil buffer 302.

If it is determined that the processing of a fragment is expected to involve reading depth data from the depth buffer 301, then a depth read flag 811 for the fragment is set to indicate that that is the case. Otherwise, the depth read flag 811 for the fragment is not set. If it is determined that the processing of a fragment is expected to involve writing depth data to (updating) the depth buffer 301, then a depth write flag 812 for the fragment is set to indicate that that is the case. Otherwise, the depth write flag 812 for the fragment is not set.

Similarly, if it is determined that the processing of a fragment is expected to involve reading stencil data from the stencil buffer 302, then a stencil read flag 821 for the fragment is set to indicate that that is the case. Otherwise, the stencil read flag 821 for the fragment is not set. If it is determined that the processing of a fragment is expected to involve writing stencil data to (updating) the stencil buffer 302, then a stencil write flag 822 for the fragment is set to indicate that that is the case. Otherwise, the stencil write flag 822 for the fragment is not set.

This determining of a culling buffer access "pattern" could be performed for each and every fragment received by the pipeline for processing. However, it may typically be the case that all of the fragments in any particular draw call have the same culling buffer access "pattern". In this case, a culling buffer access "pattern" may be determined on a per-draw call basis, with the culling buffer access flags 811, 812, 821, 822 thus being set once for all of the fragments in a draw call.

Returning to FIG. 8A, once a fragment's culling buffer access "pattern" has been determined (and culling buffer access flags 811, 812, 821, 822 appropriately set), it is determined (at step 802) whether or not the fragment is to be subjected to an early culling test by the early depth and stencil testing stage 26.

If it is determined that the fragment is not to be subjected to an early culling test, then the fragment is sent to the fragment shading stage 27 for shading (at step 810) without being subjected to an early culling test by the early depth and stencil testing stage 26.

As discussed above, in the present embodiment, a fragment that is sent to the fragment shading stage 27 in this manner may create a dependency. However, in the present embodiment, in contrast to the arrangement of FIG. 5, dependencies that relate to depth buffer 301 access and dependencies that relate to stencil buffer 302 access can be tracked separately. Moreover, the dependencies that relate to buffer read access and dependencies that relate to buffer write access can be tracked separately.

To facilitate this, in the present embodiment, when a fragment is sent to the fragment shading stage 27 without being subjected to an early culling test, only those counters which correspond to the fragment's position and which correspond to the fragment's determined culling buffer access "pattern" are incremented (at step 803).

Thus, the depth read counter 711 which corresponds to the fragment's position is incremented (at step 803) if the depth read flag 811 for the fragment is set, whereas a depth read counter 711 is not incremented if the depth read flag 811 for the fragment is not set. Similarly, the depth write counter 712 which corresponds to the fragment's position is incremented (at step 803) if the depth write flag 812 for the fragment is set, whereas a depth write counter 712 is not incremented if the depth write flag 812 for the fragment is not set.

Similarly, the stencil read counter 721 which corresponds to the fragment's position is incremented (at step 803) if the stencil read flag 821 for the fragment is set, whereas a stencil read counter 721 is not incremented if the stencil read flag 821 for the fragment is not set. Similarly, the stencil write counter 722 which corresponds to the fragment's position is incremented (at step 803) if the stencil write flag 822 for the fragment is set, whereas a stencil write counter 722 is not incremented if the stencil write flag 822 for the fragment is not set.

In this way, dependencies that a fragment creates can be tracked in a "finer grained" manner as compared to the arrangement of FIGS. 5 and 6.

If (at step 802) it is determined that the fragment is to be subjected to an early culling test by the early depth and stencil testing stage 26, then it is determined (at step 804) whether any of the plural counters corresponding to the fragment's position are (currently) greater than zero.

If it is determined that all of the counters are zero, then that indicates that there is no dependency for that fragment position that needs to be resolved before the early culling test is performed, and so the early depth and stencil testing stage 26 performs the early culling test on the fragment (at step 808) (without waiting for any dependency to resolve), and if the fragment passes the early culling test, it is sent to the fragment shading stage 27 for shading (at step 810). If the fragment fails the early culling test, it is culled.

Figure 8C:
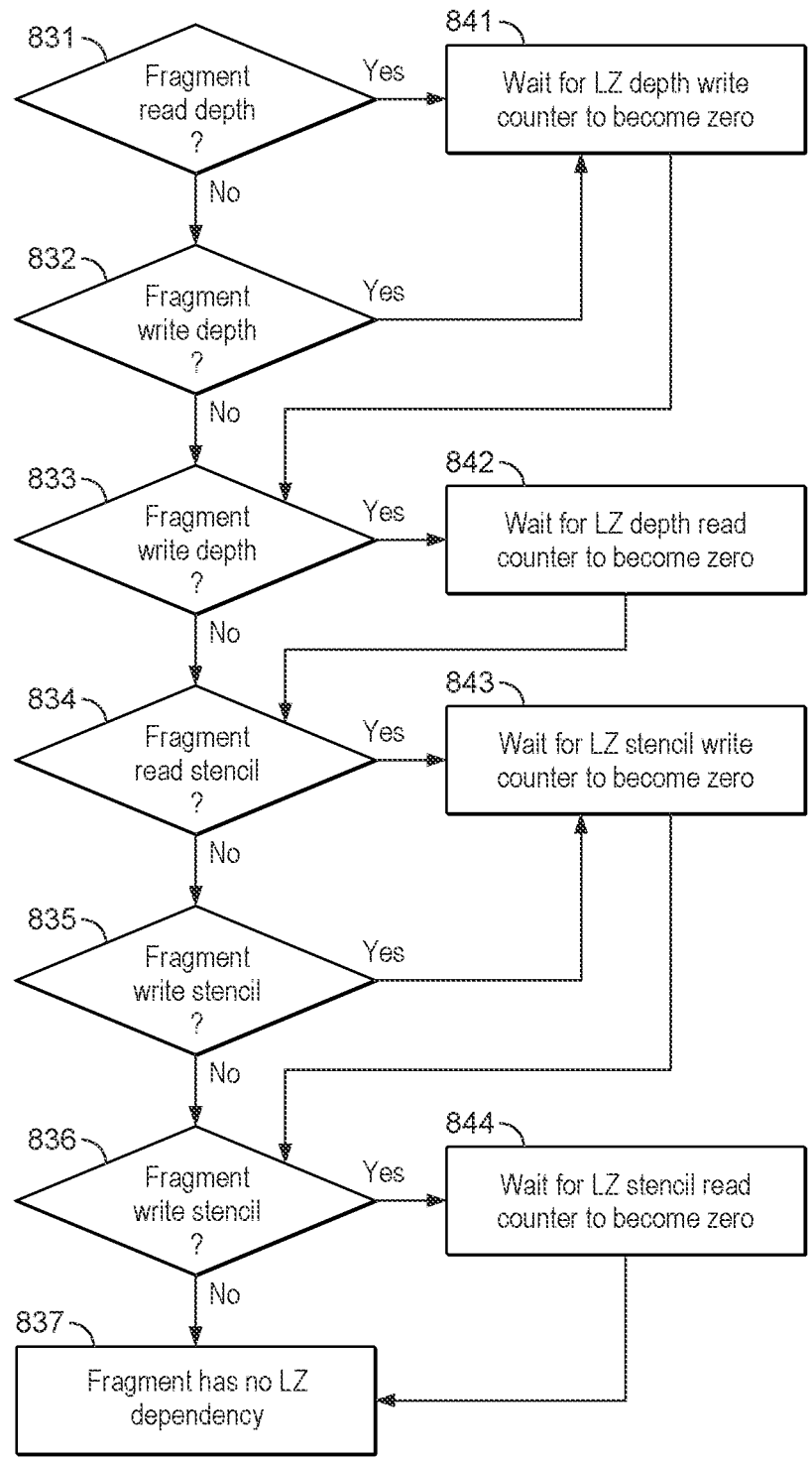

If (at step 804) it is determined that there is a counter for the fragment position that is greater than zero, then that indicates that there could be a dependency that needs to be resolved before the early culling test is performed. However, the present embodiment takes into account (at step 806) the "type" of early culling test that is to be performed when determining whether the early culling test should be stalled on account of a corresponding counter being greater than zero. FIG. 8C illustrates step 806 according to the present embodiment.

As illustrated in FIG. 8C, when (at step 831) an early culling test to be performed by the early depth and stencil testing stage 26 on a fragment is expected to involve reading depth data from the depth buffer 301, then that early culling test must wait for any earlier fragments that cover the same position(s) in the render output whose processing is expected to involve writing depth data to (updating) the depth buffer 301 to complete their processing in the late depth and stencil testing stage 28 before being performed. Thus, in this case, an early culling test is stalled (at step 841) until the depth write counter 712 corresponding to the fragment's positon becomes zero.

When (at step 832) an early culling test to be performed by the early depth and stencil testing stage 26 on a fragment is expected to involve writing depth data to (updating) the depth buffer 301, then that early culling test must wait for any earlier fragments that cover the same position(s) in the render output whose processing is expected to involve writing depth data to (updating) the depth buffer 301 to complete their processing in the late depth and stencil testing stage 28 before being performed. Thus, in this case, an early culling test is stalled (at step 841) until the depth write counter 712 corresponding to the fragment's positon becomes zero.

Thus, an early culling test to be performed on a fragment which involves accessing the depth buffer 301 is stalled until the depth write counter 712 corresponding to the fragment's position becomes zero. However, an early culling test which does not involve accessing the depth buffer 301, such as an early culling test which only involves accessing the stencil buffer 302, is not stalled on account of the depth write counter 712 being greater than zero (although it could be stalled on account of a different counter being greater than zero). This then means that, as discussed above, processing delays associated with waiting for dependencies to be resolved can be reduced or avoided, e.g. as compared to the arrangement of FIGS. 5 and 6.

Returning to FIG. 8C, when (at step 833) an early culling test to be performed by the early depth and stencil testing stage 26 on a fragment is expected to involve writing depth data to (updating) the depth buffer 301, then that early culling test must wait for any earlier fragments that cover the same position(s) in the render output whose processing is expected to involve reading depth data from the depth buffer 301 to complete their processing in the late depth and stencil testing stage 28 before being performed. Thus, in this case, an early culling test is stalled (at step 842) until the depth read counter 711 corresponding to the fragment's positon becomes zero.

Thus, an early culling test to be performed on a fragment which involves writing depth data to (updating) the depth buffer 301 is stalled until the depth read counter 711 corresponding to the fragment's positon becomes zero. However, an early culling test which does not involve writing depth data to (updating) the depth buffer 301, such as an early culling test which only involves reading depth data from the depth buffer 301 and/or accessing the stencil buffer 302, is not stalled on account of the depth read counter 711 being greater than zero (although it could be stalled on account of a different counter being greater than zero). Thus, again, processing delays associated with waiting for dependencies to be resolved can be reduced or avoided, e.g. as compared to the arrangement of FIGS. 5 and 6.

Returning again to FIG. 8C, when (at step 834) an early culling test to be performed by the early depth and stencil testing stage 26 on a fragment is expected to involve reading stencil data from the stencil buffer 302, then that early culling test must wait for any earlier fragments that cover the same position(s) in the render output whose processing is expected to involve writing stencil data to (updating) the stencil buffer 302 to complete their processing in the late depth and stencil testing stage 28 before being performed. Thus, in this case, an early culling test is stalled (at step 843) until the stencil write counter 722 corresponding to the fragment's positon becomes zero.

When (at step 835) an early culling test to be performed by the early depth and stencil testing stage 26 on a fragment is expected to involve writing stencil data to (updating) the stencil buffer 302, then that early culling test must wait for any earlier fragments that cover the same position(s) in the render output whose processing is expected to involve writing stencil data to (updating) the stencil buffer 302 to complete their processing in the late depth and stencil testing stage 28 before being performed. Thus, in this case, an early culling test is stalled (at step 843) until the stencil write counter 722 corresponding to the fragment's positon becomes zero.

Thus, an early culling test to be performed on a fragment which involves accessing the stencil buffer 302 is stalled until the stencil write counter 722 corresponding to the fragment's position becomes zero. However, an early culling test which does not involve accessing the stencil buffer 302, such as an early culling test which only involves accessing the depth buffer 301, is not stalled on account of the stencil write counter 722 being greater than zero (although it could be stalled on account of a different counter being greater than zero). Thus again, processing delays associated with waiting for dependencies to be resolved can be reduced or avoided, e.g. as compared to the arrangement of FIGS. 5 and 6.

Returning again to FIG. 8C, when (at step 836) an early culling test to be performed by the early depth and stencil testing stage 26 on a fragment is expected to involve writing stencil data to (updating) the stencil buffer 302, then that early culling test must wait for any earlier fragments that cover the same position(s) in the render output whose processing is expected to involve reading stencil data from the stencil buffer 302 to complete their processing in the late depth and stencil testing stage 28 before being performed. Thus, in this case, an early culling test is stalled (at step 844) until the stencil read counter 721 corresponding to the fragment's positon becomes zero.

Thus, an early culling test to be performed on a fragment which involves writing stencil data to (updating) the stencil buffer 302 is stalled until the stencil read counter 721 corresponding to the fragment's positon becomes zero. However, an early culling test which does not involve writing stencil data to (updating) the stencil buffer 302, such as an early culling test which only involves reading stencil data from the stencil buffer 302 and/or accessing the depth buffer 301, is not stalled on account of the stencil read counter 721 being greater than zero (although it could be stalled on account of a different counter being greater than zero). Thus, again, processing delays associated with waiting for dependencies to be resolved can be reduced or avoided, e.g. as compared to the arrangement of FIGS. 5 and 6.

It will be appreciated from the above that the finer grained dependency tracking of the present embodiment can allow different "types" of dependency situations to be distinguished from each other, such that an early culling test is not stalled on account of the existence of a dependency type that is not relevant to the culling test in question.

Returning to FIG. 8A, once any "relevant" dependency has been resolved (at step 837 in FIG. 8C), the early depth and stencil testing stage 26 performs the early culling test (at step 808), and if the fragment passes the early culling test, it is sent to the fragment shading stage 27 for shading (at step 810). If the fragment fails the early culling test, it is culled.

Figure 8D:
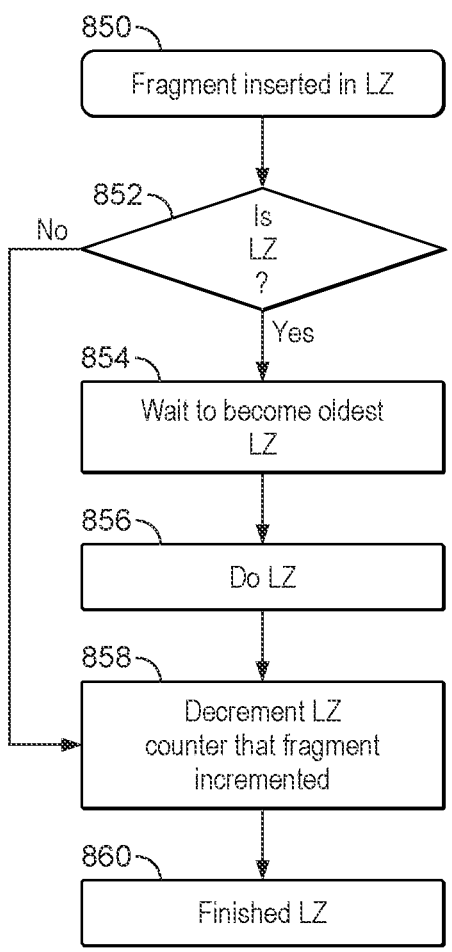

FIG. 8D illustrates the corresponding dependency tracking resolving process according to this embodiment. As discussed above, in this embodiment, any dependency created by a fragment is resolved once the fragment has completed its processing in the late depth and stencil testing stage 28.

As shown in FIG. 8D, when (at step 850) a fragment is received by the late depth and stencil testing stage 28, it is determined (at step 852) whether or not the fragment is to be subjected to a late culling test.

If it is determined that the fragment is not to be subjected to a late culling test, then each counter which corresponds to the fragment's position and determined culling buffer access "pattern" is decremented (at step 858), and the fragment has then completed its processing in the late depth and stencil testing stage 28 (at step 860). The fragment is then passed to the remainder of the graphics processing pipeline, e.g. for output.

If, on the other hand, it is determined that the fragment is to be subjected to a late culling test, then when the fragment becomes the oldest fragment that the late depth and stencil testing stage 28 is to perform a late culling test on (at step 854), the late depth and stencil testing stage 28 performs the late culling test on the fragment (at step 856), and then each counter which corresponds to the fragment's position and determined culling buffer access "pattern" is decremented (at step 858). The fragment has then completed its processing in the late depth and stencil testing stage 28 (at step 860). If the fragment passes the late culling test, it is passed to the remainder of the graphics processing pipeline, e.g. for output. If the fragment fails the late culling test, it is culled.

Figure 9:
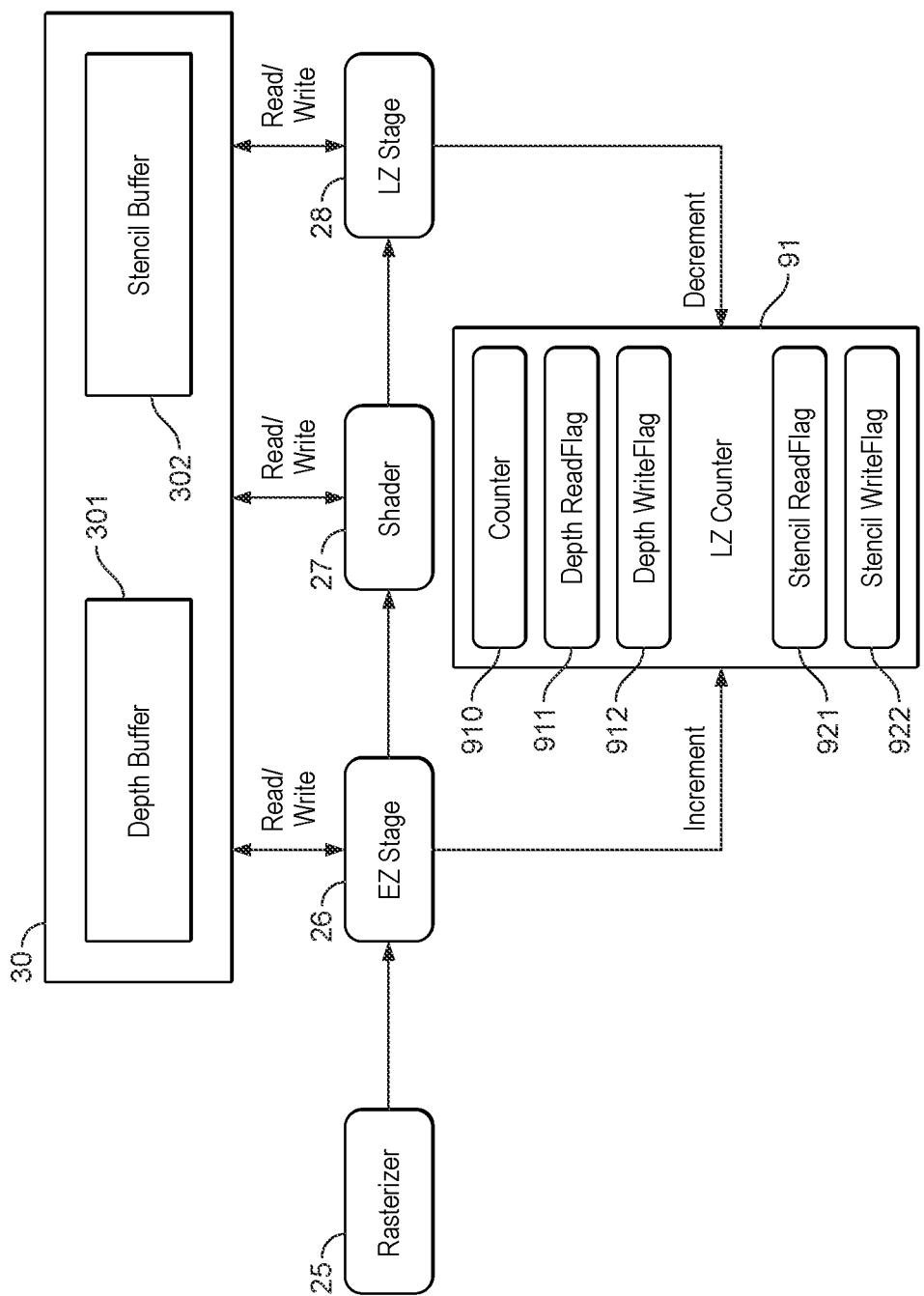
FIG. 9 shows schematically a graphics processing pipeline.

FIGS. 9 and 10 illustrate a dependency tracking arrangement according to another embodiment of the technology described herein. As illustrated in FIG. 9, in this embodiment, as in the embodiment of FIG. 7, the graphics processor 3 includes a dependency tracking stage (processing circuit) 91 that the early and late depth and stencil testing stages 26, 28 can communicate with, and which can track dependencies that relate to depth buffer 301 reads, depth buffer 301 writes, stencil buffer 302 reads, and stencil buffer 302 writes separately. However, the dependency tracking circuit 91 of the embodiment of FIG. 9 can track such dependencies in a more efficient manner as compared to the embodiment of FIG. 7.

To do this, in the present embodiment, rather than maintaining plural sets of plural counters, as is done in the embodiment of FIG. 7, the dependency tracking stage 91 of FIG. 9 maintains only a single set of counters 910, together with state information in the form of a set of dependency tracking flags 911, 912, 921, 922 that indicate what the counters of the set of counters 910 are counting.

The state information could include a set of dependency tracking flags for each counter in the set of counters 910, with each set of dependency tracking flags thus indicating what the corresponding counter in the set of counters 910 is counting. However, in the present embodiment the state information includes a single set of dependency tracking flags that represent all of the counters in the set of counters 910.

In particular, in the present embodiment, as shown in FIG. 9, the state information includes a depth read flag 911 that indicates whether or not the set of counters 910 is tracking any dependencies that relate to depth buffer 301 reads, a depth write flag 912 that indicates whether or not the set of counters 910 is tracking any dependencies that relate to depth buffer 301 writes, a stencil read flag 921 that indicates whether or not the set of counters 910 is tracking any dependencies that relate to stencil buffer 302 reads, and a stencil write flag 922 that indicates whether or not the set of counters 910 is tracking any dependencies that relate to stencil buffer 302 writes.

In the present embodiment, the render output is again divided into 2×2 blocks of adjacent sampling positions ("quads"), and the dependency tracking stage 91 maintains one counter in the set of counters 910 for each such 2×2 block of adjacent sampling positions ("quad"). Thus, in this embodiment, for each 2×2 block of adjacent sampling positions ("quad") in the render output, the dependency tracking stage 91 maintains one respective counter. Dividing the render output in a different manner would be possible.

The counters and state information maintained by the dependency tracking stage 91 are then used to determine whether there is any dependency that needs to be resolved before an early culling (depth and/or stencil) test is performed by the early depth and stencil testing stage 26. This is illustrated in FIG. 10A.

Figure 10A:
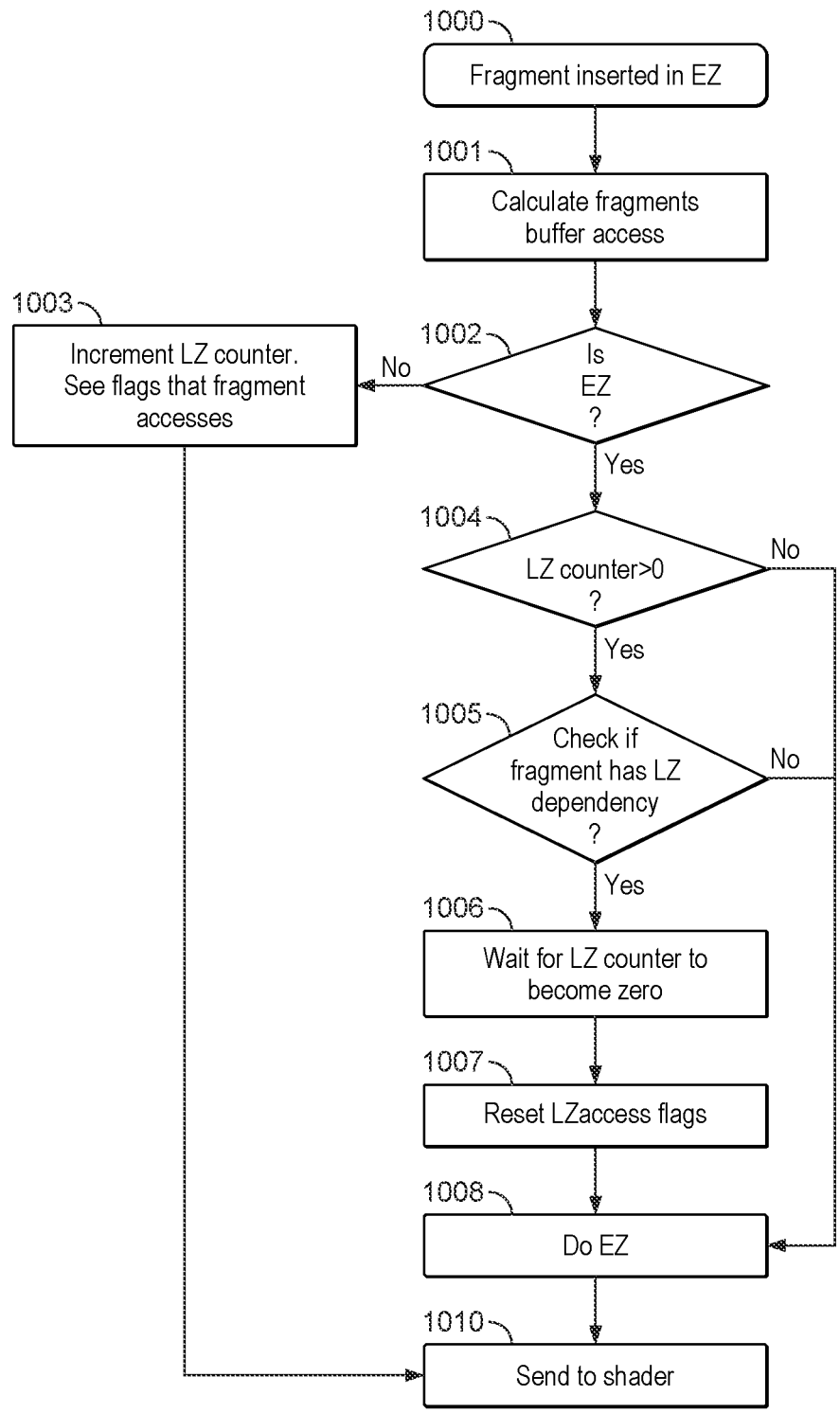
FIGS. 10A, 10B and 10C show schematically a method of operating a graphics processing pipeline.

As shown in FIG. 10A, when (at step 1000) a fragment is received by the early depth and stencil testing stage 26, any culling buffers (i.e. depth buffer 301, stencil buffer 302) that are expected to be accessed, and the manner in which those culling buffers are expected to be accessed (i.e. read or write access), for the purposes of processing that fragment are determined (at step 1001). This determining of a culling buffer access "pattern" is performed in same way as discussed above with reference to FIG. 8B.

Once a fragment's culling buffer access "pattern" has been determined (and culling buffer access flags 811, 812, 821, 822 appropriately set), it is determined (at step 1002) whether or not the fragment is to be subjected to an early culling test by the early depth and stencil testing stage 26.

If it is determined that the fragment is not to be subjected to an early culling test, then the fragment is sent to the fragment shading stage 27 for shading (at step 1010) without being subjected to an early culling test by the early depth and stencil testing stage 26.

As discussed above, in the present embodiment, a fragment that is sent to the fragment shading stage 27 in this manner may create a dependency. In the present embodiment, like in the embodiment of FIG. 7, dependencies that relate to depth buffer 301 access and dependencies that relate to stencil buffer 302 access can be tracked separately. Moreover, the dependencies that relate to buffer read access and dependencies that relate to buffer write access can be tracked separately.

To facilitate this, in the present embodiment, when a fragment is sent to the fragment shading stage 27 without being subjected to an early culling test, the counter which corresponds to the fragment's position is incremented, and the state information maintained by the dependency tracking stage 91 is set based on the fragment's determined culling buffer access "pattern" (at step 1003).

In particular, in the present embodiment, the dependency tracking flags 911, 912, 921, 922 maintained by the dependency tracking stage 91 are all initially in the not set state. Then, if (at step 1003) the depth read flag 811 for a fragment is set, the depth read flag 911 maintained by the dependency tracking stage 91 is set to indicate that the set of counters 910 is now tracking at least one dependency that relates to depth buffer 301 read access. Similarly, if (at step 1003) the depth write flag 812 for the fragment is set, the depth write flag 912 maintained by the dependency tracking stage 91 is set to indicate that the set of counters 910 is now tracking at least one dependency that relates to depth buffer 301 write access.

Similarly, if (at step 1003) the stencil read flag 821 for the fragment is set, the stencil read flag 921 maintained by the dependency tracking stage 91 is set to indicate that the set of counters 910 is now tracking at least one dependency that relates to stencil buffer 302 read access. Similarly, if (at step 1003) the stencil write flag 822 for the fragment is set, the stencil write flag 922 maintained by the dependency tracking stage 91 is set is set to indicate that the set of counters 910 is now tracking at least one dependency that relates to stencil buffer 302 write access.

In this way, dependencies that a fragment creates can be tracked in a "fine grained" manner, but in a manner that can require less signalling and storage, e.g. as compared to the embodiment of FIGS. 7 and 8.

If (at step 1002) it is determined that the fragment is to be subjected to an early culling test by the early depth and stencil testing stage 26, then it is determined (at step 1004) whether the counter 910 corresponding to the fragment's position is (currently) greater than zero.

If it is determined that the counter is zero, then that indicates that there is no dependency for that fragment position that needs to be resolved before the early culling test is performed, and so the early depth and stencil testing stage 26 performs the early culling test on the fragment (at step 1008) (without waiting for any dependency to resolve), and if the fragment passes the early culling test, it is sent to the fragment shading stage 27 for shading (at step 1010). If the fragment fails the early culling test, it is culled.

If (at step 1004) it is determined that the counter for the fragment position is greater than zero, then that indicates that there could be a dependency that needs to be resolved before the early culling test is performed. The present embodiment, like the embodiment of FIGS. 7 and 8, takes into account (at step 1005) the "type" of early culling test that is to be performed and the "type" of dependency being tracked by a counter when determining whether the early culling test should be stalled on account of the counter being greater than zero.

Figure 10B:
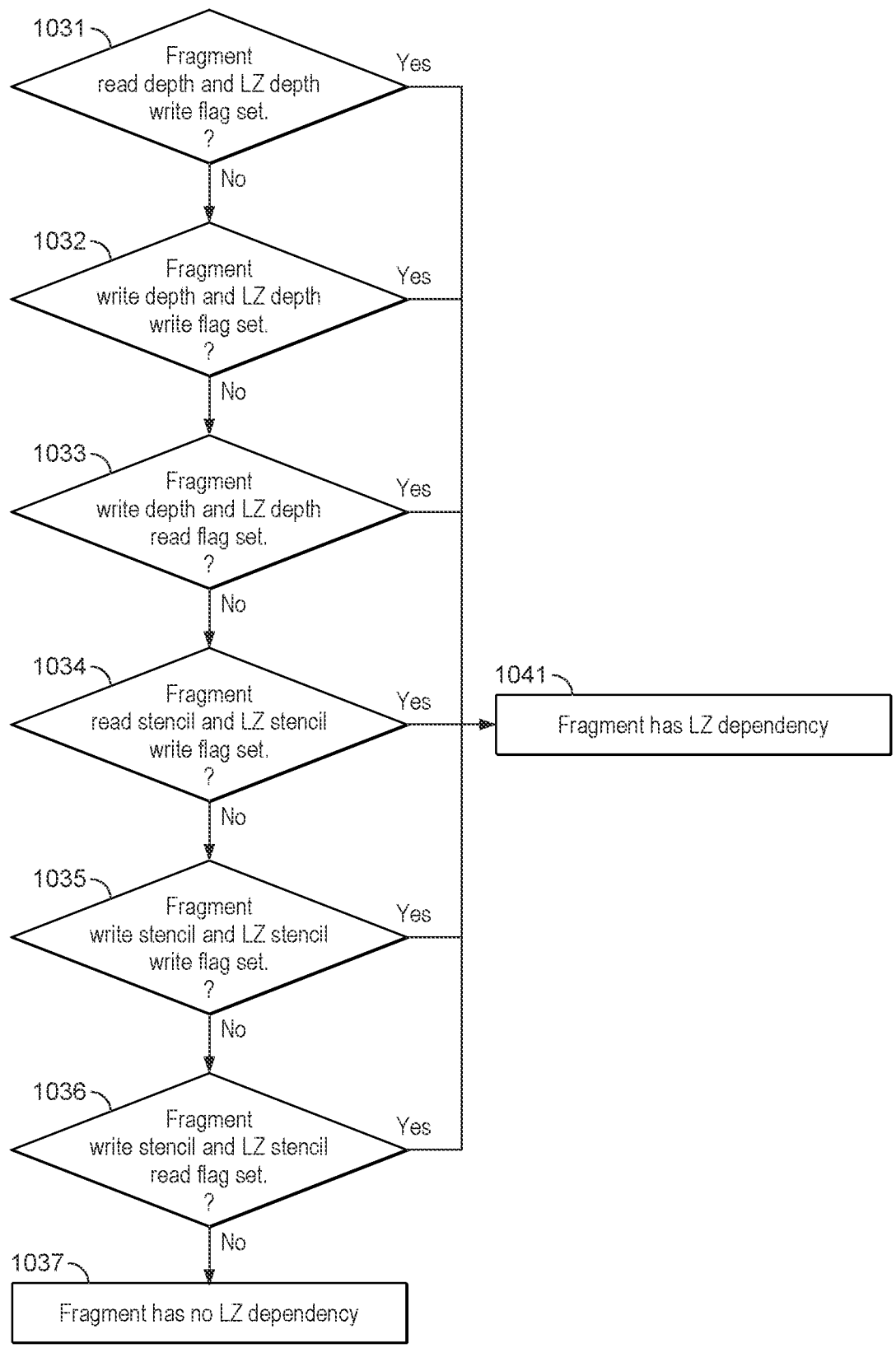

FIG. 10B illustrates the process of step 1005 according to the present embodiment whereby it is determined whether or not an early culling test should be stalled on account of a counter 910 being greater than zero.

As illustrated in FIG. 10B, if (at step 1031) an early culling test to be performed by the early depth and stencil testing stage 26 on a fragment is expected to involve reading depth data from the depth buffer 301, then it is determined that the early culling test should be stalled (at step 1041) until the counter 910 corresponding to the fragment's position becomes zero if the depth write flag 912 maintained by the dependency tracking stage 91 is set.

If (at step 1032) an early culling test to be performed by the early depth and stencil testing stage 26 on a fragment is expected to involve writing depth data to the depth buffer 301, then it is determined that the early culling test should be stalled (at step 1041) until the counter 910 corresponding to the fragment's position becomes zero if the depth write flag 912 maintained by the dependency tracking stage 91 is set.

If (at step 1033) an early culling test to be performed by the early depth and stencil testing stage 26 on a fragment is expected to involve writing depth data to the depth buffer 301, then it is determined that the early culling test should be stalled (at step 1041) until the counter 910 corresponding to the fragment's position becomes zero if the depth read flag 911 maintained by the dependency tracking stage 91 is set.

If (at step 1034) an early culling test to be performed by the early depth and stencil testing stage 26 on a fragment is expected to involve reading stencil data from the stencil buffer 302, then it is determined that the early culling test should be stalled (at step 1041) until the counter 910 corresponding to the fragment's position becomes zero if the stencil write flag 922 maintained by the dependency tracking stage 91 is set.

If (at step 1035) an early culling test to be performed by the early depth and stencil testing stage 26 on a fragment is expected to involve writing stencil data to the stencil buffer 302, then it is determined that the early culling test should be stalled (at step 1041) until the counter 910 corresponding to the fragment's position becomes zero if the stencil write flag 922 maintained by the dependency tracking stage 91 is set.

If (at step 1036) an early culling test to be performed by the early depth and stencil testing stage 26 on a fragment is expected to involve writing stencil data to the stencil buffer 302, then it is determined that the early culling test should be stalled (at step 1041) until the counter 910 corresponding to the fragment's position becomes zero if the stencil read flag 921 maintained by the dependency tracking stage 91 is set.

Otherwise, it is determined (at step 1037) that the early culling test need not be stalled until the counter 910 corresponding to the fragment's position becomes zero (i.e. it is determined that any (earlier) fragment counted by the counter 910 is not relevant to the culling test in question).

Returning to FIG. 10A, if (at step 1005) it is determined that any fragment counted by the counter 910 is not relevant to the culling test in question, then the early depth and stencil testing stage 26 performs the early culling test on the fragment (at step 1008) (without waiting for any dependency to resolve), and if the fragment passes the early culling test, it is sent to the fragment shading stage 27 for shading (at step 1010). If the fragment fails the early culling test, it is culled.

If (at step 1005) it is determined that a "relevant" dependency exists, then the early culling test is stalled (at step 1006) until that dependency is resolved, as indicated by the counter 910 becoming zero. Then, once the counter becomes zero (indicating that the dependency is resolved), the dependency tracking flags 911, 912, 921, 922 maintained by the dependency tracking stage 91 are reset to the not set state. The early depth and stencil testing stage 26 then performs the early culling test (at step 1008), and if the fragment passes the early culling test, it is sent to the fragment shading stage 27 for shading (at step 1010). If the fragment fails the early culling test, it is culled.

Figure 10C:
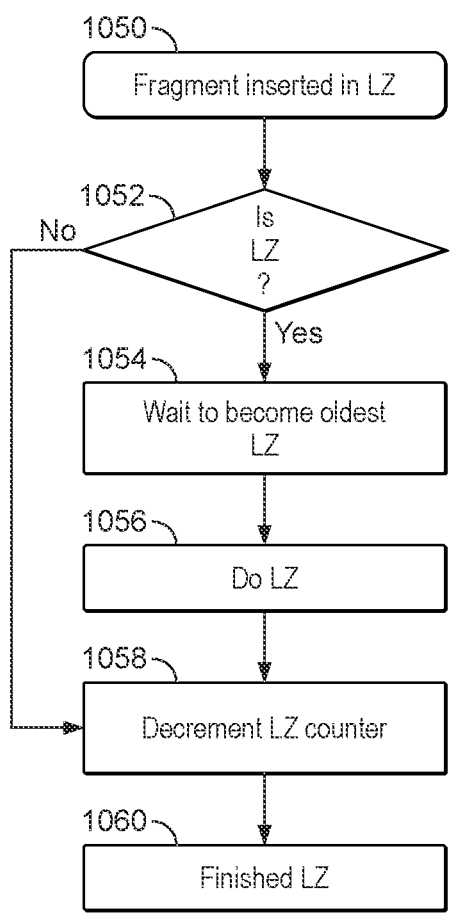

FIG. 10C illustrates the corresponding dependency tracking resolving process according to this embodiment. As discussed above, in this embodiment, any dependency created by a fragment is resolved once the fragment has completed its processing in the late depth and stencil testing stage 28.

As shown in FIG. 10C, when (at step 1050) a fragment is received by the late depth and stencil testing stage 28, it is determined (at step 1052) whether or not the fragment is to be subjected to a late culling test.

If it is determined that the fragment is not to be subjected to a late culling test, then the counter of the set of counters 910 which corresponds to the fragment's position is decremented (at step 1058), and the fragment has then completed its processing in the late depth and stencil testing stage 28 (at step 1060). The fragment is then passed to the remainder of the graphics processing pipeline, e.g. for output.

If, on the other hand, it is determined that the fragment is to be subjected to a late culling test, then when the fragment becomes the oldest fragment that the late depth and stencil testing stage 28 is to perform a late culling test on (at step 1054), the late depth and stencil testing stage 28 performs the late culling test on the fragment (at step 1056), and then the counter corresponding to the fragment's position is decremented (at step 1058). The fragment has then completed its processing in the late depth and stencil testing stage 28 (at step 1060). If the fragment passes the late culling test, it is passed to the remainder of the graphics processing pipeline, e.g. for output. If the fragment fails the late culling test, it is culled.

It will be appreciated that other arrangements for "finer grained" dependency tracking would be possible. For example, the dependency tracking stage may further maintain one or more barrier flags that can be used to force an early culling test to wait for a dependency to resolve. In this case, an early culling test may be stalled until any corresponding counters become zero whenever a corresponding barrier flag is set, regardless of the "type" of dependency being tracked by the counters.

For example, in an embodiment, the dependency tracking stage 91 of the embodiment of FIGS. 9 and 10 further maintains a set of one or more barrier flags, e.g. one barrier flag for each 2×2 block of adjacent sampling positions ("quad"). In this case, when a fragment is sent to the fragment shading stage 27 without being subjected to an early culling test, it is determined, based on the culling buffer access flags 811, 812, 821, 822 for the fragment and the dependency tracking flags 911, 912, 921, 922 maintained by the dependency tracking stage 91, whether a dependency that may be created by the fragment "conflicts" with dependencies that may be created by earlier fragments that are already being tracked by the set of counters 910, such that it is not appropriate for the new fragment to be counted together with those earlier fragments by the set of counters 910. If it is determined that the new fragment does "conflict", then a corresponding barrier flag is set so as to force any dependencies created by the earlier fragments to resolve before a dependency for the new fragment is considered.

This arrangement may be particular suited to situations where the culling buffer access flags 811, 812, 821, 822 will be the same for all fragments in a draw call, as in this case a change in culling buffer access flags 811, 812, 821, 822, and thus the potential for a "conflict", will only occur whenever a new draw call is received by the pipeline.

The "finer grained" dependency tracking of embodiments of the technology described herein may be suited to various graphics processing operations. In one example, "finer grained" dependency tracking is used when rendering deferred lights using a stencil culling method.

These methods involve determining which (if any) regions of a lighting volume need to be rendered. To do this, a first rendering pass is performed to determine regions of the lighting volume that are actually visible, i.e. not occluded by scene geometry. This involves performing a first depth test in respect of the lighting volume front faces, and writing stencil data to the stencil buffer 302 that indicates a result of the first depth test. A second rendering pass is then performed to determine regions of the lighting volume that actually intersect the scene geometry. This involves performing a second depth test in respect of the lighting volume back faces. Only those regions of the lighting volume that are indicated by the stencil data in the stencil buffer 302 as having passed the first, front faces depth test, and that are determined in the second rendering pass as passing the second, back faces depth test, are rendered.

In this case, the first rendering pass typically involves a "read only" early depth test that reads from, but does not write to, the depth buffer 301. The second rendering pass then typically involves an early stencil test to cull regions that failed the first depth test, followed by a "read only" late depth test that reads from, but does not write to, the depth buffer 301.

In this case, when a first light is drawn, dependencies may be created due to the "read only" late depth test of the second rendering pass reading from the depth buffer 301. If such potential dependencies were to be tracked in the manner of the arrangement of FIGS. 5 and 6, then the "read only" early depth test of the first rendering pass for a second, overlapping light could need to be stalled on account of potential dependencies tracked from the drawing of the first light. However, tracking dependencies in a "finer grained" manner, e.g. as discussed above with reference to FIGS. 7 to 10, allows any depth "read only" potential dependencies tracked from drawing the first light to be "ignored" for the purposes of the "read only" early depth tests for drawing the second, overlapping light. Thus, stalling of the early depth tests of the first rendering pass when drawing the second, overlapping light can be reduced or avoided. Accordingly, processing delays can be reduced or avoided.

It will be appreciated from the above that the technology described herein, in its embodiments at least, provides arrangements in which processing delays associated with tracking dependencies can be reduced. This is achieved, in the embodiments of the technology described herein at least, by tracking dependencies in a "fine grained" manner. In particular, in the embodiments of the technology described herein, dependencies are tracked such that dependencies that relate to depth buffer access can be distinguished from dependencies that relate to stencil buffer access, and in an embodiment also such that dependencies that relate to read access can be distinguished from dependencies that relate to write access.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor that is operable to execute a graphics processing pipeline that comprises plural processing stages including an early culling tester followed by a renderer;
    wherein the graphics processor comprises plural culling test data buffers including at least a first culling test data buffer and a second culling test data buffer, wherein each of the plural culling test data buffers is operable to store a respective set of data values for use by the early culling tester;
    the method comprising:
    maintaining information that indicates which, if any, of the plural culling test data buffers are expected to be accessed by a processing stage of the graphics processing pipeline after the early culling tester, wherein:
        the information indicates whether or not a processing stage of the graphics processing pipeline after the early culling tester is expected to access the first culling test data buffer; and
        the information separately indicates whether or not a processing stage of the graphics processing pipeline after the early culling tester is expected to access the second culling test data buffer;
    the method further comprising: using the information to control the early culling tester.

2. The method of claim 1, wherein the first culling test data buffer is a depth buffer and the second culling test data buffer is a stencil buffer.

3. The method of claim 1, wherein the information indicates, for each of plural sets of one or more sampling positions, whether or not a processing stage of the graphics processing pipeline after the early culling tester is expected to access a sampling position of the respective set of sampling positions.

4. The method of claim 1, wherein using the information to control the early culling tester comprises:
    when the early culling tester is to perform an early culling test that accesses the first culling test data buffer:
        determining whether to stall the early culling test based on whether the information indicates that a processing stage of the graphics processing pipeline after the early culling tester is expected to access the same position in the first culling test data buffer; and
        when it is determined to stall the early culling test, stalling the early culling test; and
        when it is not determined to stall the early culling test, performing the early culling test without stalling; and
    when the early culling tester is to perform an early culling test that accesses the second culling test data buffer:
        determining whether to stall the early culling test based on whether the information indicates that a processing stage of the graphics processing pipeline after the early culling tester is expected to access the same position in the second culling test data buffer; and
        when it is determined to stall the early culling test, stalling the early culling test; and
        when it is not determined to stall the early culling test, performing the early culling test without stalling.

5. The method of claim 1, wherein the information comprises separate sets of tracking data, each set of tracking data associated with a respective one of the plural culling test data buffers.

6. The method of claim 1, wherein the information comprises a combined set of tracking data, and association information indicating which, if any, of the plural culling test data buffers the combined set of tracking data is associated with.

7. The method of claim 1, wherein:
    the information indicates whether or not a processing stage of the graphics processing pipeline after the early culling tester is expected to read from a culling test data buffer; and
    the information separately indicates whether or not a processing stage of the graphics processing pipeline after the early culling tester is expected to write to a culling test data buffer.

8. The method of claim 7, wherein using the information to control the early culling tester comprises:
    when the early culling tester is to perform an early culling test that is expected to read from, but not write to, a culling test data buffer:
        determining whether to stall the early culling test based on whether the information indicates that a processing stage of the graphics processing pipeline after the early culling tester is expected to read from, but not write to, the same position in the same culling test data buffer as the early culling test is expected to read from; and
        when it is determined to stall the early culling test, stalling the early culling test; and
        when it is not determined to stall the early culling test, performing the early culling test without stalling.

9. A method of operating a graphics processor that is operable to execute a graphics processing pipeline that comprises plural processing stages including an early culling tester followed by a renderer;

wherein the graphics processor comprises one or more culling test data buffers, wherein each of the one or more culling test data buffers is operable to store a respective set of data values for use by the early culling tester;

the method comprising maintaining information, wherein:
the information indicates whether or not a processing stage of the graphics processing pipeline after the early culling tester is expected to read from the one or more culling test data buffers; and
the information separately indicates whether or not a processing stage of the graphics processing pipeline after the early culling tester is expected to write to the one or more culling test data buffers;
the method further comprising: using the information to control the early culling tester.

10. A graphics processor that is operable to execute a graphics processing pipeline that comprises plural processing stages including an early culling tester followed a renderer; the graphics processor comprising:
plural culling test data buffers including at least a first culling test data buffer and a second culling test data buffer, wherein each of the plural culling test data buffers is operable to store a respective set of data values for use by the early culling tester; and
a processing circuit configured to maintain information that indicates which, if any, of the plural culling test data buffers are expected to be accessed by a processing stage of the graphics processing pipeline after the early culling tester, wherein:
the information indicates whether or not a processing stage of the graphics processing pipeline after the early culling tester is expected to access the first culling test data buffer; and
the information separately indicates whether or not a processing stage of the graphics processing pipeline after the early culling tester is expected to access the second culling test data buffer;
wherein the graphics processor is configured to control the early culling tester using information maintained by the processing circuit.

11. The graphics processor of claim 10, wherein the first culling test data buffer is a depth buffer and the second culling test data buffer is a stencil buffer.

12. The graphics processor of claim 10, wherein the information indicates, for each of plural sets of one or more sampling positions, whether or not a processing stage of the graphics processing pipeline after the early culling tester is expected to access a sampling position of the respective set of sampling positions.

13. The graphics processor of claim 10, wherein the graphics processor is configured to control the early culling tester using information maintained by the processing circuit by:
when the early culling tester is to perform an early culling test that accesses the first culling test data buffer:
determining whether to stall the early culling test based on whether the information indicates that a processing stage of the graphics processing pipeline after the early culling tester is expected to access the same position in the first culling test data buffer; and
when it is determined to stall the early culling test, stalling the early culling test; and
when it is not determined to stall the early culling test, performing the early culling test without stalling; and
when the early culling tester is to perform an early culling test that accesses the second culling test data buffer:
determining whether to stall the early culling test based on whether the information indicates that a processing stage of the graphics processing pipeline after the early culling tester is expected to access the same position in the second culling test data buffer; and
when it is determined to stall the early culling test, stalling the early culling test; and
when it is not determined to stall the early culling test, performing the early culling test without stalling.

14. The graphics processor of claim 10, wherein the information comprises separate sets of tracking data, each set of tracking data associated with a respective one of the plural culling test data buffers.

15. The graphics processor of claim 10, wherein the information comprises a combined set of tracking data, and association information indicating which, if any, of the plural culling test data buffers the combined set of tracking data is associated with.

16. The graphics processor of claim 10, wherein:
the information indicates whether or not a processing stage of the graphics processing pipeline after the early culling tester is expected to read from a culling test data buffer; and
the information separately indicates whether or not a processing stage of the graphics processing pipeline after the early culling tester is expected to write to a culling test data buffer.

17. The graphics processor of claim 16, wherein the graphics processor is configured to control the early culling tester using information maintained by the processing circuit by:
when the early culling tester is to perform an early culling test that is expected to read from, but not write to, a culling test data buffer:
determining whether to stall the early culling test based on whether the information indicates that a processing stage of the graphics processing pipeline after the early culling tester is expected to read from, but not write to, the same position in the same culling test data buffer as the early culling test is expected to read from; and
when it is determined to stall the early culling test, stalling the early culling test; and
when it is not determined to stall the early culling test, performing the early culling test without stalling.

18. A graphics processor that is operable to execute a graphics processing pipeline that comprises plural processing stages including an early culling tester followed a renderer; the graphics processor comprising:
one or more culling test data buffers, wherein each of the one or more culling test data buffers is operable to store a respective set of data values for use by the early culling tester; and
a processing circuit configured to maintain information, wherein:
the information indicates whether or not a processing stage of the graphics processing pipeline after the early culling tester is expected to read from the one or more culling test data buffers; and
the information separately indicates whether or not a processing stage of the graphics processing pipeline after the early culling tester is expected to write to the one or more culling test data buffers;
wherein the graphics processor is configured to control the early culling tester using information maintained by the processing circuit.

19. A non-transitory computer readable storage medium storing software code which when executing on a processor performs a method of operating a graphics processor that is operable to execute a graphics processing pipeline that comprises plural processing stages including an early culling tester followed by a renderer;
  wherein the graphics processor comprises plural culling test data buffers including at least a first culling test data buffer and a second culling test data buffer, wherein each of the plural culling test data buffers is operable to store a respective set of data values for use by the early culling tester;
  the method comprising:
  maintaining information that indicates which, if any, of the plural culling test data buffers are expected to be accessed by a processing stage of the graphics processing pipeline after the early culling tester, wherein:
    the information indicates whether or not a processing stage of the graphics processing pipeline after the early culling tester is expected to access the first culling test data buffer; and
    the information separately indicates whether or not a processing stage of the graphics processing pipeline after the early culling tester is expected to access the second culling test data buffer;
  the method further comprising: using the information to control the early culling tester.

* * * * *